(12) United States Patent
Konyo et al.

(10) Patent No.: US 12,360,603 B2
(45) Date of Patent: Jul. 15, 2025

(54) TACTILE COMMUNICATION SYSTEM, TACTILE COMMUNICATION DEVICE, TACTILE COMMUNICATION PROGRAM, AND TACTILE COMMUNICATION METHOD

(71) Applicant: TOHOKU UNIVERSITY, Sendai (JP)

(72) Inventors: Masashi Konyo, Sendai (JP); Kosuke Yamaguchi, Sendai (JP); Satoshi Tadokoro, Sendai (JP)

(73) Assignee: TOHOKU UNIVERSITY, Sendai (JP)

( * ) Notice: Subject to any disclaimer, the term of this patent is extended or adjusted under 35 U.S.C. 154(b) by 42 days.

(21) Appl. No.: 18/566,271

(22) PCT Filed: Jun. 4, 2021

(86) PCT No.: PCT/JP2021/021468
§ 371 (c)(1),
(2) Date: Dec. 1, 2023

(87) PCT Pub. No.: WO2022/254733
PCT Pub. Date: Dec. 8, 2022

(65) Prior Publication Data
US 2025/0013305 A1   Jan. 9, 2025

(51) Int. Cl.
*G06F 3/01* (2006.01)
(52) U.S. Cl.
CPC ............... *G06F 3/016* (2013.01); *G06F 3/01* (2013.01)
(58) Field of Classification Search
CPC .................................. G06F 3/016; G06F 3/01
See application file for complete search history.

(56) References Cited

U.S. PATENT DOCUMENTS 8,665,216 B2 *  3/2014  Karasin ............... G06F 3/038
                                              345/184
9,001,032 B2 *  4/2015  Yang .................. G06F 3/014
                                              345/169

(Continued)

FOREIGN PATENT DOCUMENTS

| JP | 2012-168775 A | 9/2012 |
| WO | 2018/047475 A1 | 3/2018 |
| WO | 2021/085506 A1 | 5/2021 |

OTHER PUBLICATIONS

International Search Report issued by the Japan Patent Office for corresponding International Patent Application No. PCT/JP2021/021468, mailed on Aug. 17, 2021, with an English translation.

(Continued)

*Primary Examiner* — John A Tweel, Jr.
(74) *Attorney, Agent, or Firm* — Myers Wolin, LLC

(57) ABSTRACT

A tactile transmission system (100) including a tactile transmission device (3) and a different tactile transmission device (3) includes a vibration measurement unit (31) that measures a vibration generated at the tactile transmission device (3), a calculation unit that calculates perception information specified from the vibration measured by the vibration measurement unit (31), a conversion unit that converts a signal related to the vibration into a predetermined frequency while maintaining the perception information calculated by the calculation unit, and a signal output unit that causes a vibrator (32) of the different tactile transmission device (3) to output a converted signal converted by the conversion unit as an output vibration. A bidirectional tactile transmission system including a tactile transmission device and a different tactile transmission device includes: a vibration sensor configured to measure a vibration generated at the tactile transmission device; a calculator configured to calculate perception information specified from the vibra- (Continued)

tion measured by the vibration sensor; a convector configured to convert a signal related to the vibration into a predetermined frequency while maintaining the perception information calculated by the calculator; and signal output processor circuitry configured to cause a vibrator of the different tactile transmission device to output a converted signal converted by the converter as an output vibration, wherein, similarly, the different tactile transmission device causes a vibrator of the tactile transmission device to output a vibration generated at the different tactile transmission device as an output vibration.

17 Claims, 39 Drawing Sheets

(56) References Cited

U.S. PATENT DOCUMENTS

| | | | | |
|---|---|---|---|---|
| 10,268,286 B2* | 4/2019 | Venkatesan | ........... | G06F 1/3259 |
| 10,739,856 B2* | 8/2020 | Yokoyama | .............. | G06F 3/016 |
| 2019/0206203 A1 | 7/2019 | Takeuchi et al. | | |
| 2022/0198891 A1 | 6/2022 | Konyo et al. | | |

OTHER PUBLICATIONS

Kayakawa et al., "Design of Interactive Audio-Visual-Tactile Media 'Public Booth for Vibrotactile Communication' for Telecommunication with Heightened Presence", The Virtual Reality Society of Japan TVRSJ vol. 25, No. 4, pp. 412-421, 2020, with English abstract.

Notice of Reasons for Refusal issued by the Japan Patent Office for corresponding Japanese Patent Application No. 2023-525349, mailed on Jul. 2, 2024, with an English translation.

International Preliminary Report on Patentability issued by WIPO for corresponding International Patent Application No. PCT/JP2021/021468, mailed on Dec. 14, 2023, with an English translation.

* cited by examiner

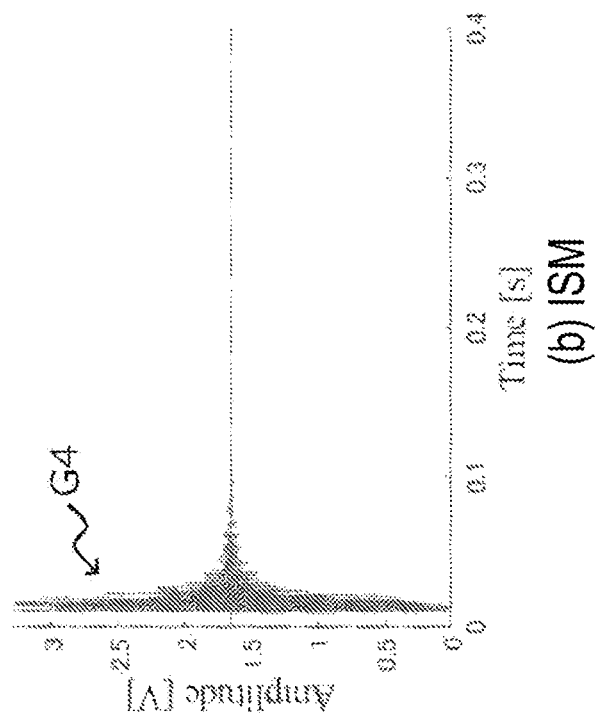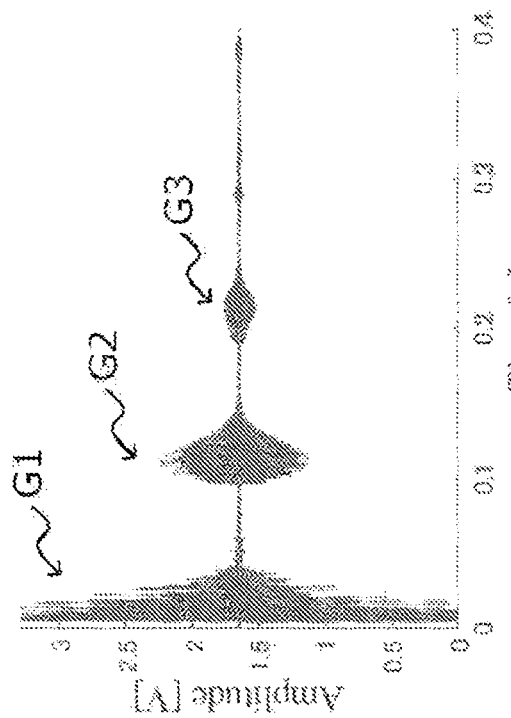
FIG. 9

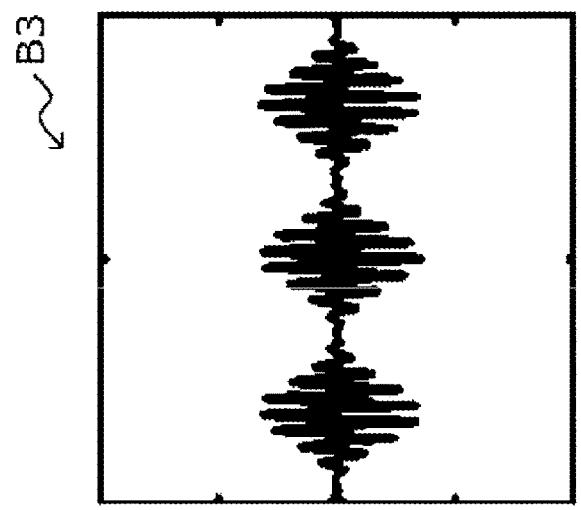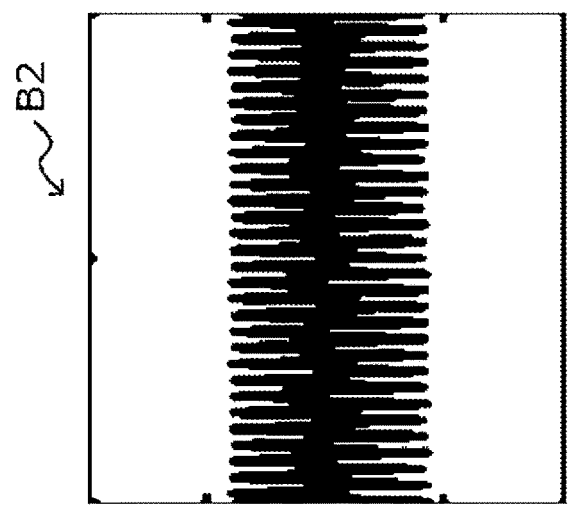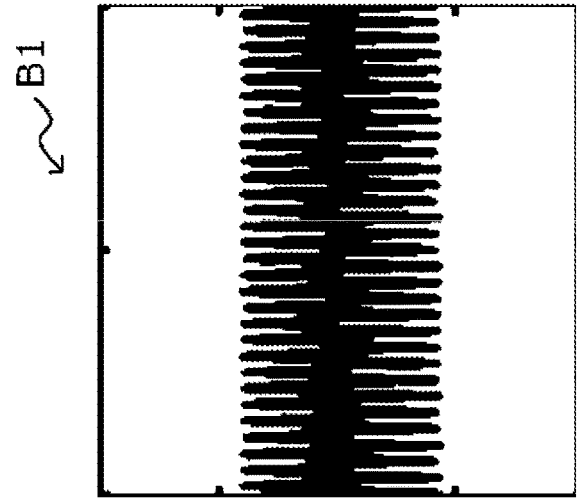
FIG. 19

TACTILE COMMUNICATION SYSTEM, TACTILE COMMUNICATION DEVICE, TACTILE COMMUNICATION PROGRAM, AND TACTILE COMMUNICATION METHOD

CROSS-REFERENCE TO RELATED APPLICATION

This application is a National Stage application under 35 U.S.C. 371 of International Application No. PCT/JP2021/021468, filed on Jun. 4, 2021 and designated the U.S. The contents of which are herein incorporated by reference.

TECHNICAL FIELD

The technology described in the present specification relates to a tactile transmission system, a tactile transmission device, a tactile transmission program, and a tactile transmission method.

BACKGROUND ART

Technologies that enable communication with voices and images in remote places, such as those for telephones, video conferences, and social virtual reality (VR), have been developed. More advanced communication than ever before has been realized by transmitting tactile vibrations in addition to voices and images.

CITATION LIST

Non-Patent Literature

Non-Patent Document 1: Hirohiko Hayakawa et al., "Design of Interactive Audio-Visual-Tactile Media 'Public Booth for Vibrotactile Communication' for Telecommunication with Heightened Presence", TVRSJ Vol. 25 No. 4 pp. 412-421, Dec. 25, 2020

SUMMARY

Technical Problem

In tactile communication for bidirectionally transmitting a vibration generated when a user touches a housing, it is desirable that a vibration sensor for measuring a vibration and an actuator for generating a vibration be mounted in the same housing. In this case, a contact vibration generated between the user and the housing, which is applied as an input, appears at around the amplitude modulated wave of the natural vibration of the housing. On the other hand, when the housing is vibrated by the actuator for tactile presentation as an output, a vibration near the natural vibration of the housing is also generated.

When a plurality of such tactile input/output devices are bidirectionally connected to each other, a sensor signal and a looped-back drive signal of an actuator are driven at near the same natural vibration, which may cause a howling phenomenon.

Although a means for suppressing a signal in the frequency band of the natural vibration by using a band-pass filter or the like is used in acoustic signals in order to reduce such howling, in the case of a tactile transmission, since tactile information to be transmitted also exists in the same band, and thus, if the gain is reduced, there is a possibility of the quality of contact information deteriorating.

In one aspect, the technology described in the present specification aims to reduce howling and loopback of a contact signal in a bidirectional tactile transmission system.

Solution to Problem

According to one aspect, a tactile transmission system is a tactile transmission system including a tactile transmission device and a different tactile transmission device and includes a vibration measurement unit that measures a vibration generated at the tactile transmission device, a calculation unit that calculates perception information specified from the vibration measured by the vibration measurement unit, a conversion unit that converts a signal related to the vibration into a predetermined frequency while maintaining the perception information calculated by the calculation unit, and a signal output unit that causes a vibrator of the different tactile transmission device to output a converted signal converted by the conversion unit as an output vibration.

Advantageous Effects

In one aspect, howling and loopback of a contact signal in a bidirectional tactile transmission system may be reduced.

BRIEF DESCRIPTION OF DRAWINGS

FIG. 9(a) is a graph showing the output vibration measurement result in the case of through output, and FIG. 9(b) is a graph showing the output vibration measurement result when ISM was used.

FIG. 19 illustrates sample waveforms of vibrations used in a forced tri-choice discrimination experiment performed to determine the discriminability shown in the graph of FIG. 18.

DESCRIPTION OF EMBODIMENTS

Figure 1:
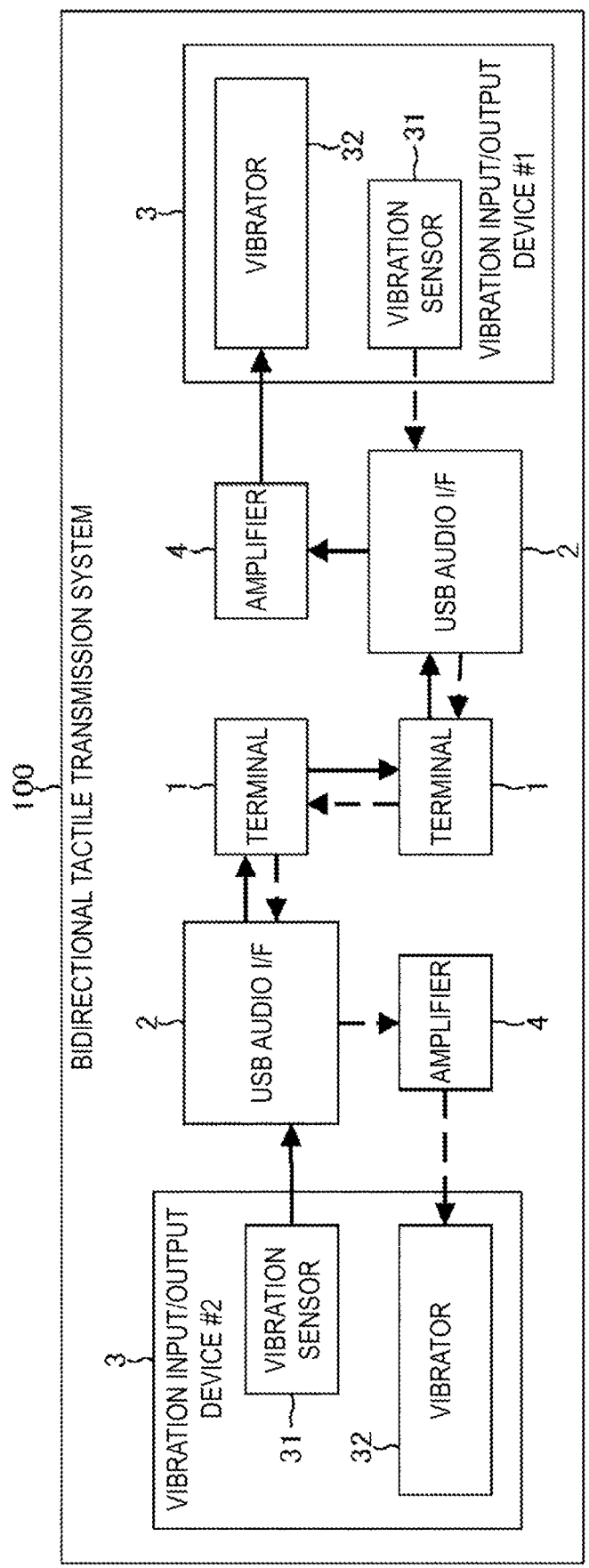
FIG. 1 is a block diagram schematically illustrating a hardware configuration example of a bidirectional tactile transmission system according to an embodiment.

Hereinafter, embodiments will be described with reference to the drawings. However, the embodiments described below are merely examples, and there is no intention to exclude various modifications and applications of techniques that are not explicitly described in the embodiments. That is, the present embodiment can be modified and implemented in various ways without departing from the scope of the present embodiment.

In addition, each drawing is not intended to include only components illustrated therein, and may include other components. Hereinafter, in the drawings, parts denoted by the same reference numerals indicate the same or similar parts unless otherwise specified.

[A] Embodiment

[A-1] Bidirectional Tactile Transmission Process

FIG. 1 is a block diagram schematically illustrating a hardware configuration example of a bidirectional tactile transmission system 100 according to an embodiment.

The bidirectional tactile transmission system 100 includes, for example, two terminals 1 (in other words, tactile transmission devices), two Universal Serial Bus (USB) audio interfaces (I/F) 2, two vibration input/output devices 3 (vibration input/output devices #1 and #2), and two amplifiers 4. Each of the two vibration input/output devices 3 includes a vibration sensor 31 (in other words, a vibration measurement unit) and a vibrator 32 (in other words, a vibrator).

In FIG. 1, the solid-line arrows indicate the flow of a signal when a vibration generated by the vibration input/output device #2 is transmitted to the vibration input/output device #1, and the broken-line arrows indicate the flow of a signal when a vibration generated by the vibration input/output device #1 is transmitted to the vibration input/output device #2.

The vibration sensors 31 measure vibrations and transmit signals to the terminals 1 via the USB audio I/F 2. Each terminal 1 performs an ISM process or a through-output process to transmit a signal to the other terminal 1 at a remote place. The terminal 1 at the remote place outputs a vibration generated from the transmitted signal to the vibrator 32 via the USB audio I/F 2 and the amplifier 4. Further, a tactile sense may be transmitted among three or more parties by providing three or more sets of the terminal 1, the USB audio I/F 2, the vibration input/output device 3, and the amplifier 4. Furthermore, for a user who does not want to experience transmission of a tactile sense, a mute function of turning off the output of a vibration generated by the vibrator 32 may be provided.

Further, details of ISM will be described below with reference to FIGS. 17 to 39 and the like.

FIGS. 2(a) and 2(b) are block diagrams schematically illustrating a software configuration example of the bidirectional tactile transmission system 100 illustrated in FIG. 1.

The bidirectional tactile transmission system 100 functions as, at each of bases #1 and #2, a vibration measurement unit 211, a signal amplifying unit 212, a signal input processing unit 213, a signal transmission unit 214, a signal reception unit 215, a signal output processing unit 216, a signal amplifying unit 217, and a vibration presenting unit 218 as illustrated in FIGS. 2(a) and 2(b).

The functions as the vibration measurement unit 211 and the signal amplifying unit 212 may be realized by the vibration sensor 31 illustrated in FIG. 1, the function as the signal input processing unit 213 may be realized by the USB audio I/F 2 illustrated in FIG. 1 and a CPU 11 of the terminal 1 described below with reference to FIG. 16, and the function as the signal transmission unit 214 may be realized by a communication I/F (not illustrated) of the terminal 1 which will be described below with reference to FIG. 16. In addition, the function as the signal reception unit 215 is realized by a communication I/F (not illustrated) of the terminal 1 to be described below with reference to FIG. 16, the function as the signal output processing unit 216 is realized by the USB audio I/F 2 illustrated in FIG. 1 and the CPU 11 of the terminal 1 to be described below with reference to FIG. 16, the function as the signal amplifying unit 217 is realized by the amplifier 4 illustrated in FIG. 1, and the function as the vibration presenting unit 218 is realized by the vibrator 32 illustrated in FIG. 1.

The vibration measurement unit 211 measures a vibration of a housing that the user touches. The signal amplifying unit 212 amplifies the signal measured by the vibration measurement unit 211. The signal input processing unit 213 performs signal processing which will be described below with reference to FIGS. 3 to 5 and the like. The signal transmission unit 214 transmits the signal processed by the signal input processing unit 213 to another base. The tactile signal may be transmitted in synchronization with video and audio. In addition, the tactile signal may be transmitted by being included in an audio channel such as a moving image.

The signal reception unit 215 receives a signal transmitted from another base. The signal output processing unit 216 performs signal processing to be described below with reference to FIGS. 3 to 5 and the like on the signal received by the signal reception unit 215. The signal amplifying unit 217 amplifies the signal processed by the signal output processing unit 216. The vibration presenting unit 218 vibrates the housing that the user touches according to the signal amplified by the signal amplifying unit 217.

Figure 2:
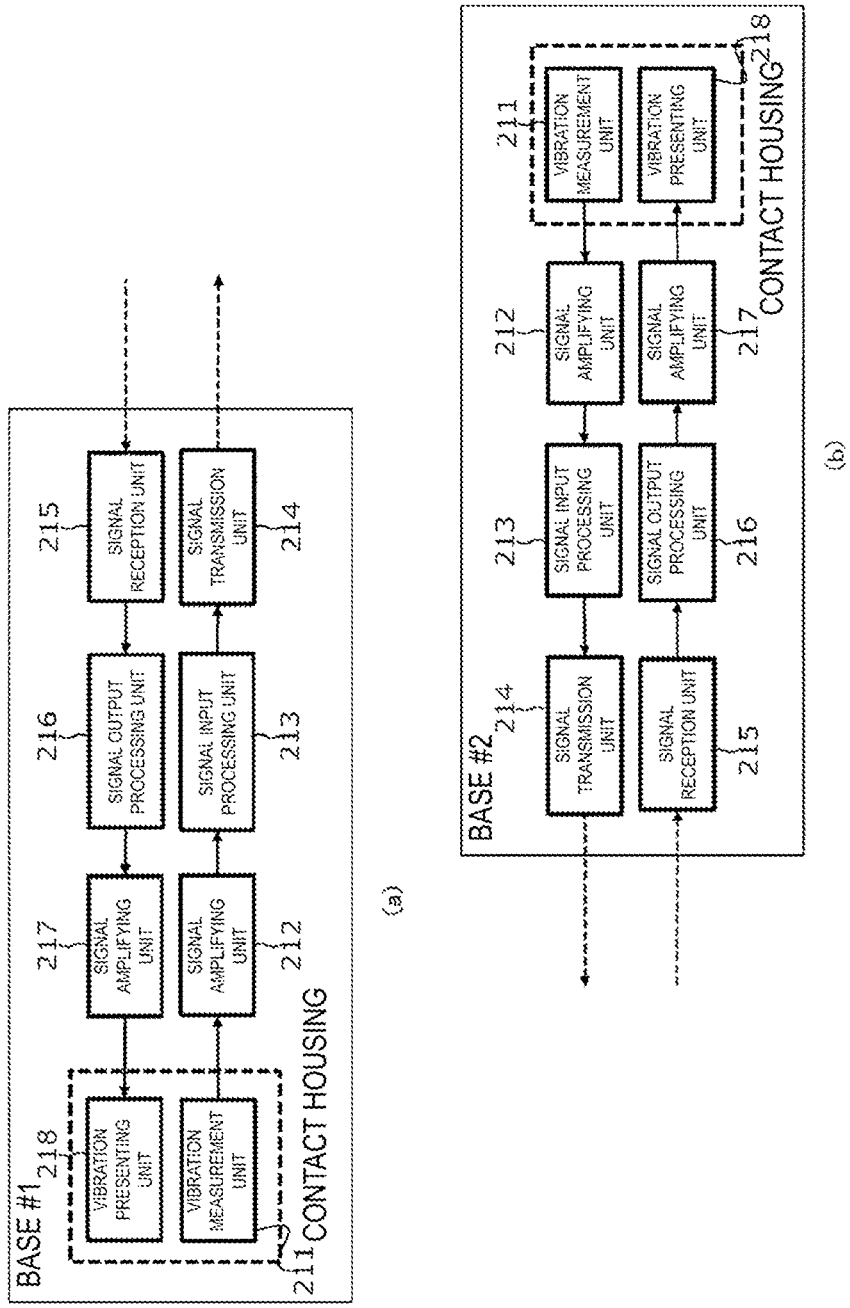
FIGS. 2(a) and 2(b) are block diagrams schematically showing a software configuration example of the bidirectional tactile transmission system illustrated in FIG. 1.

FIG. 3(a) is a block diagram illustrating a first example of the signal input processing unit 213 illustrated in FIG. 2, and FIG. 3(b) is a block diagram illustrating a first example of the signal output processing unit 216 illustrated in FIG. 2.

The signal input processing unit 213 includes functions as an AD conversion unit 2131, a band-stop filter 2132, an equalizer 2133, and a frequency conversion unit 2134 as illustrated in FIG. 3(a). In addition, the signal output processing unit 216 has functions as a buffering 2161 and a DA conversion unit 2162 as illustrated in FIG. 3(b).

The function as the AD conversion unit 2131 may be realized by the USB audio I/F 2 illustrated in FIG. 1, and the functions as the band-stop filter 2132, the equalizer 2133, and the frequency conversion unit 2134 may be realized by the CPU 11 of the terminal 1 described below with reference to FIG. 16. The function as the buffering 2161 may be realized by a memory 12 or a communication IF (not illustrated) of the terminal 1 described below with reference to FIG. 16, and the function as the DA conversion unit 2162 may be realized by the USB audio I/F 2 illustrated in FIG. 1.

In the transmission end, an analog signal is converted into a digital signal by the AD conversion unit 2131, a frequency band used for presenting a vibration is removed by the band-stop filter 2132, a signal of a specific band is emphasized by the equalizer 2133, frequency conversion is performed by the frequency conversion unit 2134, and then the presented vibration is transmitted to the reception end. Further, the equalizer 2133 may be omitted.

In the reception end, the presented vibration received by the buffering 2161 is buffered, and the digital signal of the presented vibration is converted into an analog signal by the DA conversion unit 2162.

FIG. 4(a) is a block diagram illustrating a second example of the signal input processing unit 213 (see reference symbol 213a) illustrated in FIG. 2, and FIG. 4(b) is a block diagram illustrating a second example of the signal output processing unit 216 (see reference symbol 216a) illustrated in FIG. 2.

The signal input processing unit 213a includes functions as an AD conversion unit 2131, a band-stop filter 2132, and an equalizer 2133 as illustrated in FIG. 4(a). In addition, the signal output processing unit 216a has functions as a buffering 2161, a DA conversion unit 2162, and a frequency conversion unit 2163 as illustrated in FIG. 4(b).

The function as the AD conversion unit 2131 may be realized by the USB audio I/F 2 illustrated in FIG. 1, and the functions as the band-stop filter 2132 and the equalizer 2133 may be realized by the CPU 11 of the terminal 1 to be described below with reference to FIG. 16. The function as the frequency conversion unit 2163 may be realized by the CPU 11 of the terminal 1 to be described below with reference to FIG. 16, the function as the buffering 2161 may be realized by the memory 12 of the terminal 1 to be described below with reference to FIG. 16, and the function as the DA conversion unit 2162 may be realized by the USB audio I/F 2 illustrated in FIG. 1.

In the transmission end, an analog signal is converted into a digital signal by the AD conversion unit 2131, a frequency band used for presenting a vibration is removed by the band-stop filter 2132, a signal of a specific band is emphasized by the equalizer 2133, and then the signal is transmitted to the reception end. Further, the equalizer 2133 may be omitted.

In the reception end, the signal received by the frequency conversion unit 2163 undergoes frequency conversion, the frequency-converted presented vibration is buffered by the buffering 2161, and the digital signal of the presented vibration is converted into an analog signal by the DA conversion unit 2162.

FIG. 5(a) is a block diagram illustrating a third example of the signal input processing unit 213 (see reference symbol 213b) illustrated in FIG. 2, and FIG. 5(b) is a block diagram illustrating a third example of the signal output processing unit 216 (see reference symbol 216b) illustrated in FIG. 2.

The signal input processing unit 213b includes functions as an AD conversion unit 2131, a band-stop filter 2132, an equalizer 2133, and an intensity calculation unit 2135 as illustrated in FIG. 5(a). In addition, the signal output processing unit 216b has functions as a buffering 2161, a DA conversion unit 2162, and a vibration waveform generation unit 2164 as illustrated in FIG. 5(b).

The function as the AD conversion unit 2131 may be realized by the USB audio I/F 2 illustrated in FIG. 1, and the functions as the band-stop filter 2132, the equalizer 2133, and the intensity calculation unit 2135 may be realized by the CPU 11 of the terminal 1 to be described below with reference to FIG. 16. The function as the vibration waveform generation unit 2164 may be realized by the CPU 11 of the terminal 1 to be described below with reference to FIG. 16, the function as the buffering 2161 may be realized by the memory 12 of the terminal 1 to be described below with reference to FIG. 16, and the function as the DA conversion unit 2162 may be realized by the USB audio I/F 2 illustrated in FIG. 1.

In the transmission end, an analog signal is converted into a digital signal by the AD conversion unit 2131, a frequency band used for presenting a vibration is removed by the band-stop filter 2132, a signal of a specific band is emphasized by the equalizer 2133, a vibration intensity is calculated by the intensity calculation unit 2135, and then the signal is transmitted to the reception end. Since the vibration intensity may be updated at an update rate of about 100 Hz as compared with the waveform signal, there is an effect of reducing the communication amount. Further, the equalizer 2133 may be omitted.

In the reception end, a vibration is generated based on the received vibration intensity by the vibration waveform generation unit 2164, the frequency-converted presented vibration is buffered by the buffering 2161, and the digital signal of the presented vibration is converted into an analog signal by the DA conversion unit 2162.

Next, the frequency conversion process performed by the frequency conversion units 2134 and 2163 will be described in the following (1) to (3).

(1) Frequency Conversion Process Example I

Figure 3:
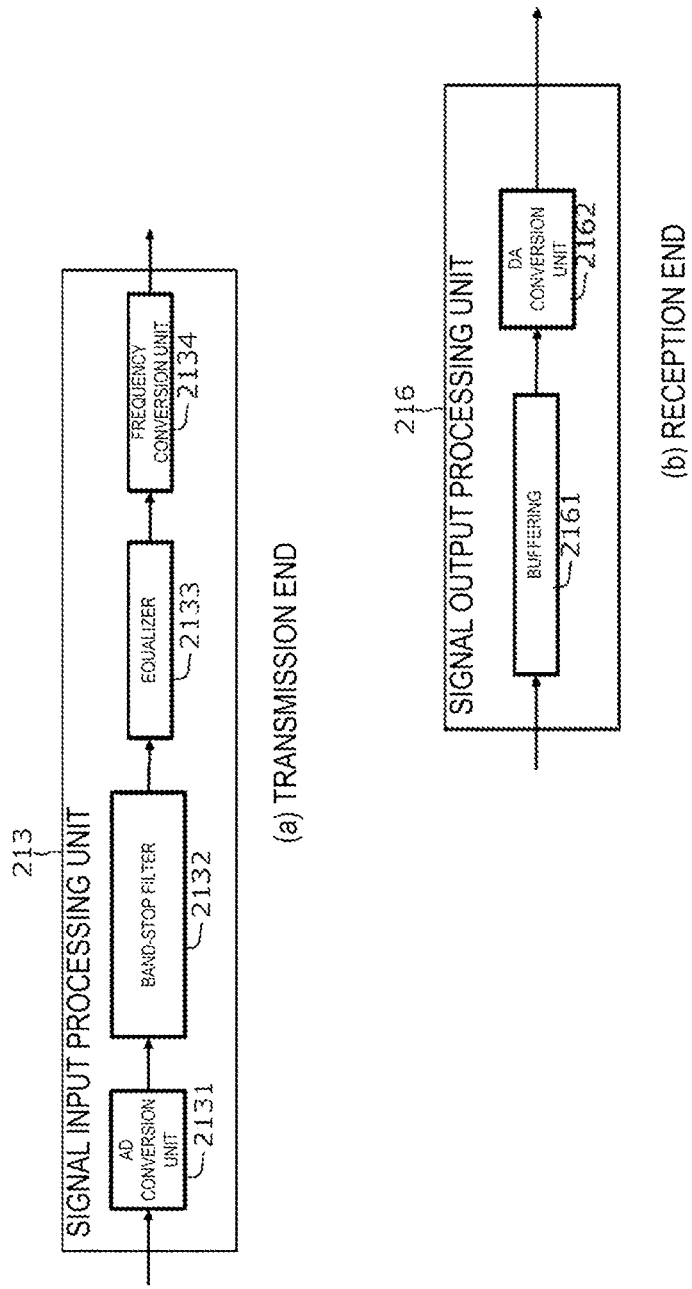
FIG. 3(a) is a block diagram illustrating a first example of the signal input processing unit illustrated in FIG. 2.
FIG. 3(b) is a block diagram illustrating a first example of the signal output processing unit illustrated in FIG. 2.
Figure 4:
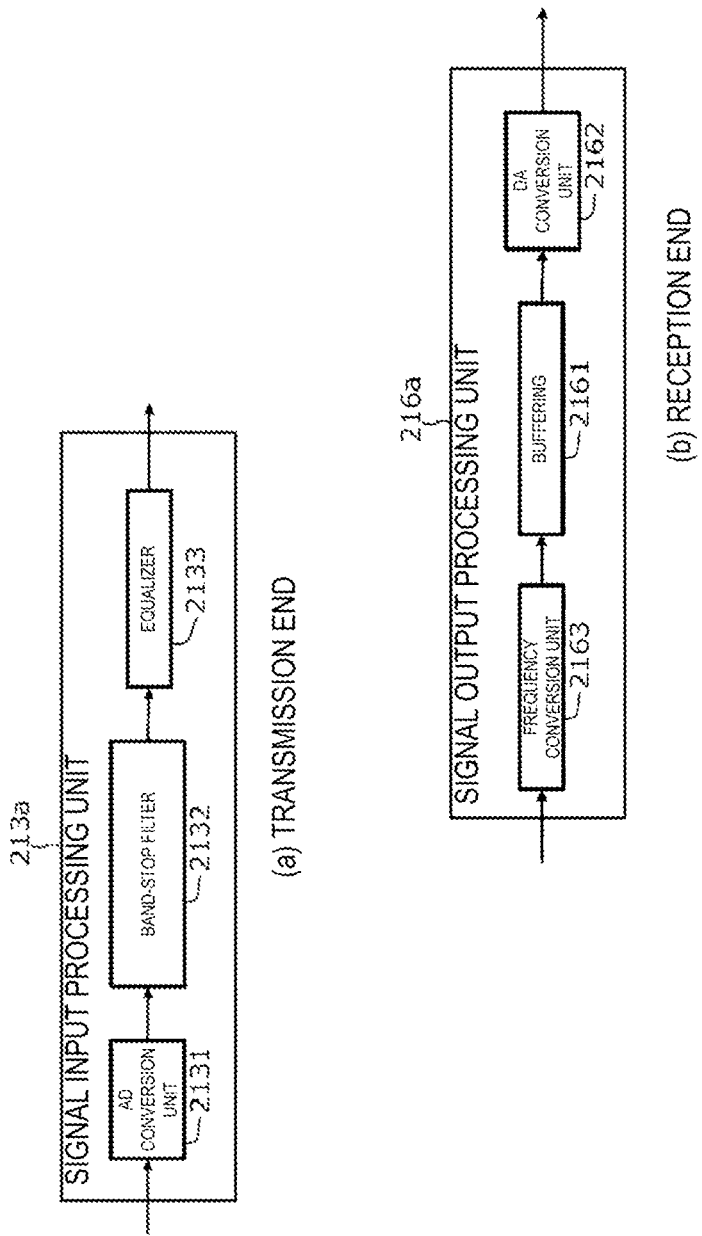
FIG. 4(a) is a block diagram illustrating a second example of the signal input processing unit illustrated in FIG. 2.
FIG. 4(b) is a block diagram illustrating a second example of the signal output processing unit illustrated in FIG. 2.
Figure 6:
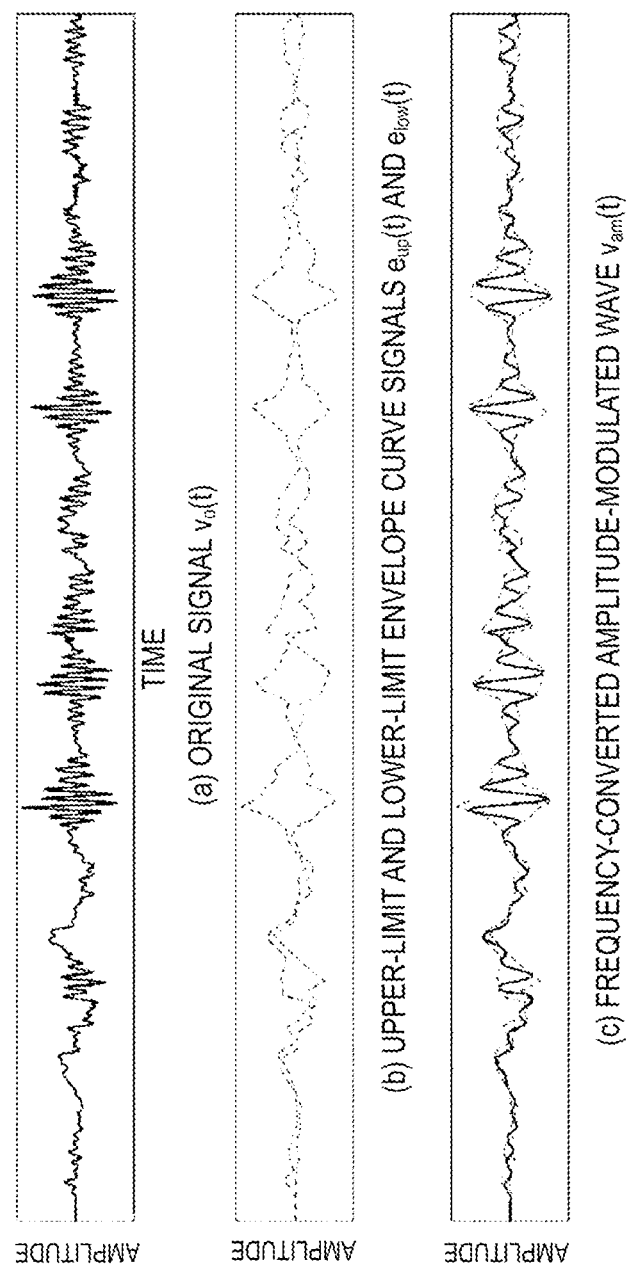
FIGS. 6(a) to 6(c) are graphs for explaining a frequency conversion process by the frequency conversion unit illustrated in FIGS. 3 and 4.

FIGS. 6(*a*) to 6(*c*) are graphs for explaining the frequency conversion process by the frequency conversion units 2134 and 2163 illustrated in FIGS. 3 and 4.

The frequency conversion units 2134 and 2163 maintain an envelope curve (in other words, perception information) and present it as an amplitude modulated wave. FIG. 6(*a*) shows an original signal $v_0(t)$, FIG. 6(*b*) shows the upper-limit and lower-limit envelope curve signals $C_{up}$ (t) and $e_{low}$ (t) of the original signal by dotted lines, and FIG. 6(*c*) shows an amplitude modulated wave $v_{am}(t)$ generated to be included in the envelope curve of FIG. 6(*b*). The amplitude modulated wave $v_{am}(t)$ is expressed by the following expression.

$$\begin{cases} v_{am}(t) = A(t)\sin(2\pi ft) + v_{off}(t) \\ A(t) = (e_{up}(t) - e_{low}(t))/2 \\ v_{off}(t) = (e_{up}(t) + e_{low}(t))/2 \end{cases} \quad \text{[Math 1]}$$

Here, A(t) is the amplitude of the amplitude modulated wave, f is the carrier frequency of the amplitude modulated wave to be presented, and $v_{off}(t)$ is the offset of the amplitude modulated wave.

The carrier frequency f is selected to be a frequency with frequency components different from those of the original signal. For f, a frequency of about 150 to 400 Hz that is easily sensed by humans is required to be selected. This makes it possible to sense fluctuations of the original signal in the envelope curve.

(2) Frequency Conversion Process Example II

The frequency conversion units 2134 and 2163 may perform the frequency conversion process by performing mapping at a subjective intensity equivalent to that of a stimulus. It is assumed that a subjective intensity of a vibration having a frequency f and an amplitude A is obtained from a function S (A, f). When a representative frequency $f_0$ of the vibration of the original signal can be identified, the amplitude A is obtained such that a subjective intensity S ($A_0$, $f_0$) and a subjective intensity S (A, f) of the frequency-converted vibration are equivalent. The equivalent subjective intensity function may use, for example, an equal loudness curve of the vibration obtained in a magnitude/balance method.

(3) Frequency Conversion Process Example III

The frequency conversion units 2134 and 2163 may perform the frequency conversion process using only the perceived intensity expressed by the following expression 2. Using the following expression, the perceived intensity of the representative frequency $f_0$ of the original signal is obtained, and the amplitude A is obtained such that the perceived intensity of the frequency-converted vibration becomes equivalent thereto.

$$I_{pc} = \left[\left(\frac{A}{T_f}\right)^2\right]^{b_f} \quad \text{[Math 2]}$$

Here, A represents an amplitude, $T_f$ represents an amplitude threshold at a frequency f, and $b_f$ represents an exponent value that depends on the frequency f.

ISM is a method of using a time-divided perceived intensity, and may be a method obtained by adding a time-division process to the process by the above-described frequency conversion units 2134 and 2163.

Figure 7:
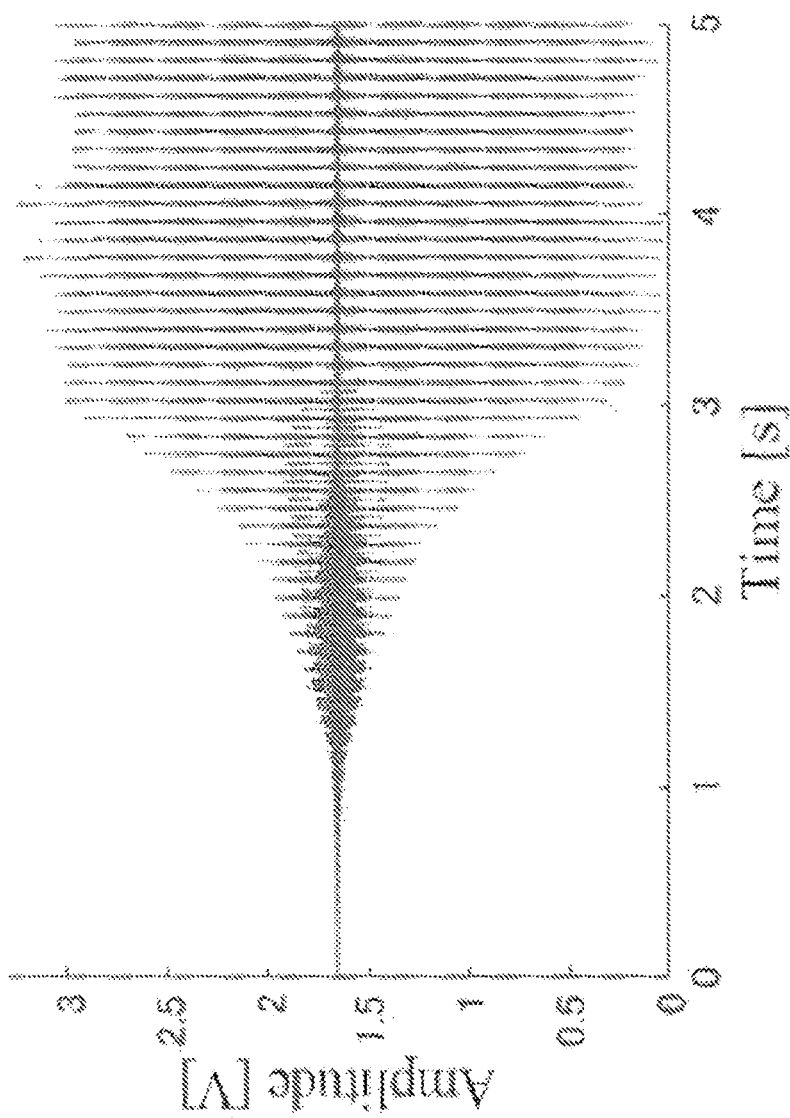
FIG. 7 is a graph showing an amplitude measurement result in through output (when a signal is output without processing).

FIG. 7 is a graph showing an amplitude measurement result in through output.

In the bidirectional tactile transmission system 100 illustrated in FIG. 1, howling was verified under the following conditions.

Sensor: Piezoelectric vibration sensor VS-BV203
Vibrator: Audio Exciter TEAX09C005-8
USB audio: OCTA-CAPTURE
Amplifier: SA-36A PRO
Device: Matt-processed polystyrene board having a length of 100 mm and a width of 150 mm In the case of the through output, howling was confirmed as shown in FIG. 7. On the other hand, when the ISM process was performed, howling did not occur even though the sensor sensitivity was increased higher than in the case of the through output. In other words, it has been confirmed that frequency modulation is effective for vibration howling.

Figure 8:
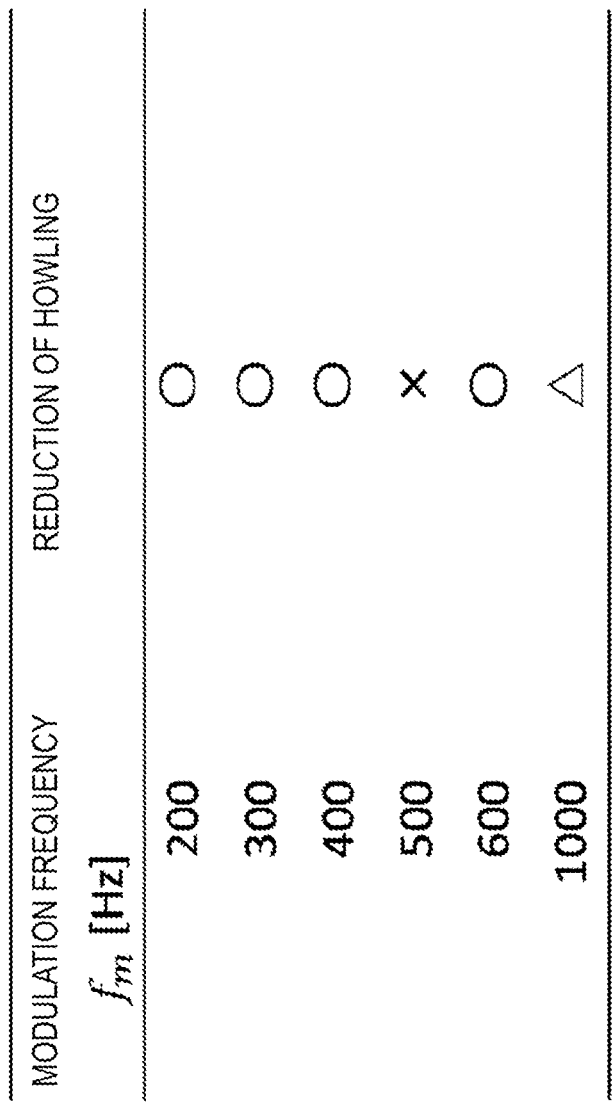
FIG. 8 is a table showing the howling reduction result when Intensity Segment Modulation (ISM) was used in the bidirectional tactile transmission system illustrated in FIG. 1.

FIG. 8 is a table showing the howling reduction result when ISM was used in the bidirectional tactile transmission system 100 illustrated in FIG. 1.

It was verified whether howling occurs by changing the modulation frequency ($f_m$) converted in ISM. The natural frequency of a plate is about 500 Hz, and $f_m$ is 200 to 1000 Hz.

In FIG. 8, O indicates that oscillation does not occur even when a vibration is applied, Δ indicates that oscillation occurs when a vibration is slightly applied, and x indicates that self-excitation occurs even when no vibration is applied.

It has been confirmed that, when $f_m$ and the natural frequency of the plate were made equal to each other, howling occurred with a slight vibration even without touching the plate. In addition, it has been confirmed that howling occurs when a vibration is applied to the plate at twice the natural frequency which is a harmonic of the natural frequency. On the other hand, it has been confirmed that howling does not occur at other frequencies even if a vibration was applied to the plate. That is, it has been confirmed that howling can be prevented by converting a vibration into a frequency away from the natural frequency in ISM.

FIG. 9(a) is a graph showing the output vibration measurement result in the case of through output, and FIG. 9(b) is a graph showing the output vibration measurement result when ISM was used.

In ISM, a vibration can be converted into a predetermined carrier frequency. The vibration caused by the vibrator is removed by applying a filter for removing the carrier frequency components of the ISM to sensor measurement values.

The frequency converted in the ISM was set to 200 Hz, the frequency of 200 Hz was removed by the band-stop filter 2132, and an impulse waveform was presented as an initial vibration.

In the case of the through output, the loopback indicated by reference symbols G2 and G3 was repeated a plurality of times while the initial vibration indicated by reference symbol G1 was attenuated as shown in FIG. 9(a). On the other hand, in the case of ISM, no loopback occurred after the initial vibration indicated by reference symbol G4 as shown in FIG. 9(b). Thus, it has been confirmed that the combination of the ISM process and the filtering is effective for the loopback.

Specific examples of vibration input/output devices 3 and 3a to 3e will now be described with reference to FIGS. 10 to 15.

Figure 10:
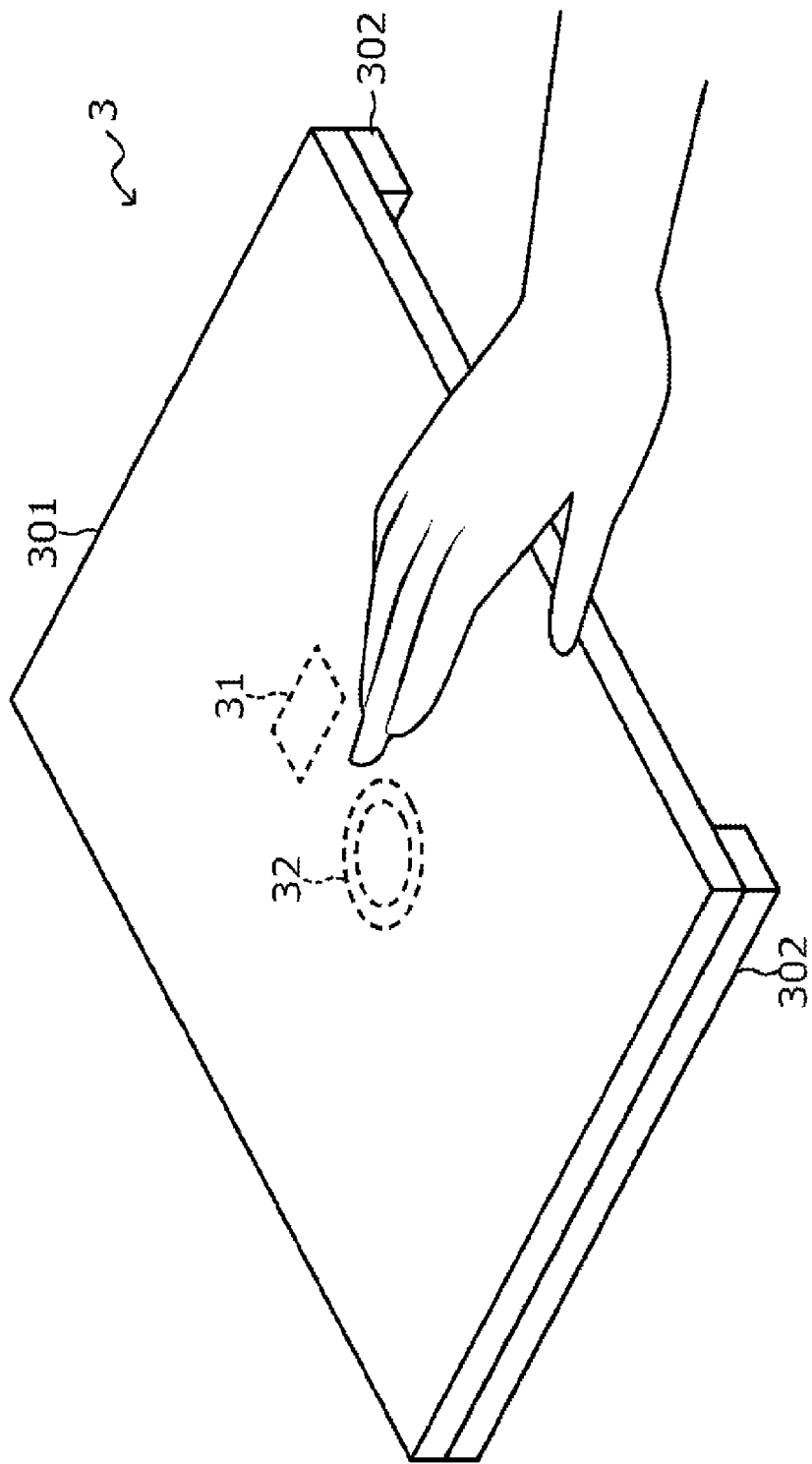
FIG. 10 is a diagram illustrating a first example of an environment installation-type vibration input/output device.

FIG. 10 is a diagram illustrating a first example of an environment installation-type vibration input/output device 3.

In the vibration input/output device 3 illustrated in FIG. 10, a vibration sensor 31 and the vibrator 32 (in other words, vibrator) are disposed on the back surface of a contact plate 301.

When the user touches the contact plate 301, the vibration input/output device 3 detects and presents a tactile sense. Two fixing portions 302 each having a rectangular parallelepiped shape may be attached along two sides of the back surface of the contact plate 301, and thus the contact plate 301 may be fixed to a desk, a laptop computer-type terminal 1, a keyboard (not illustrated), or the like by the fixing portions 302. The contact plate 301 may have a structure in which both end portions thereof are fixed and an intermediate portion thereof is raised to make the front surface thereof easily shaken. An image may be projected to be superimposed on the contact plate 301 to display an image or the like of the transmission partner.

Figure 11:
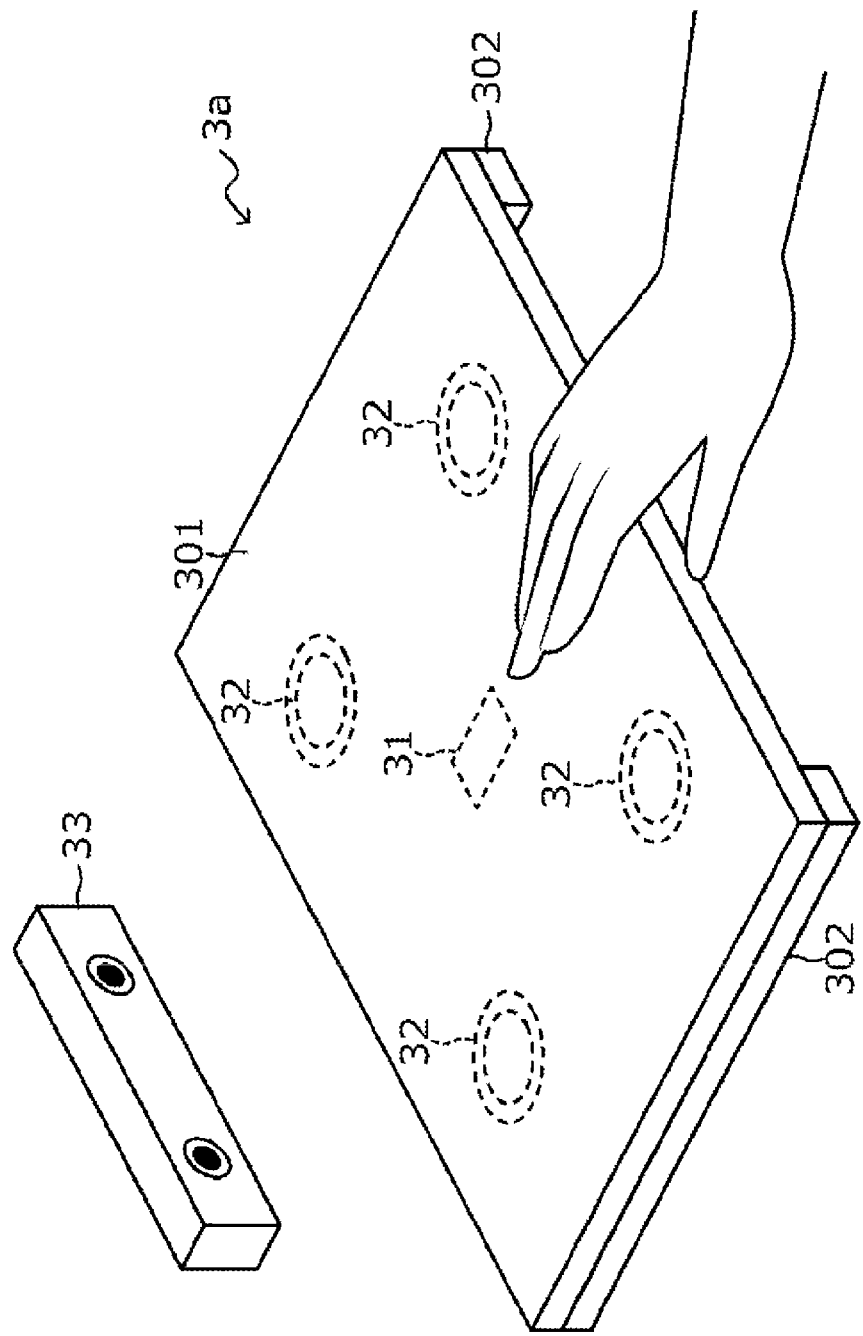
FIG. 11 is a diagram illustrating a second example of the environment installation-type vibration input/output device.

FIG. 11 is a diagram illustrating a second example of the environment installation-type vibration input/output device 3a.

In the vibration input/output device 3a illustrated in FIG. 11, the contact plate 301 is fixed by two fixing portions 302 similarly to the vibration input/output device 3 illustrated in FIG. 10. The vibration input/output device 3a includes one vibration sensor 31 and a plurality of (four in the illustrated example) vibrators 32 on the back surface of the contact plate 301. In addition, a contact position sensing sensor 33 (in other words, a contact position detection sensor) that detects a contact position by using a depth camera or the like that tracks a position of a hand by using a stereo camera may be separately disposed. In other words, in the vibration input/output device 3 illustrated in FIG. 1, the contact position sensing sensor 33 may be additionally disposed.

In this way, a sensation of movement of a vibration may be output to the vibrator 32 based on the detection result by the contact position sensing sensor 33. For example, a vibration is distributed and output to the plurality of vibrators 32 of the vibration input/output device 3a in the reception end based on information (for example, coordinate information) about a contact position on the contact plate 301 detected by the contact position sensing sensor 33. By disposing the plurality of vibrators 32, the vibration intensity and the stimulation time difference of each vibrator 32 can be adjusted in accordance with the contact position of the communication partner and a sensation of movement of a contact target can be virtually expressed.

Figure 12:
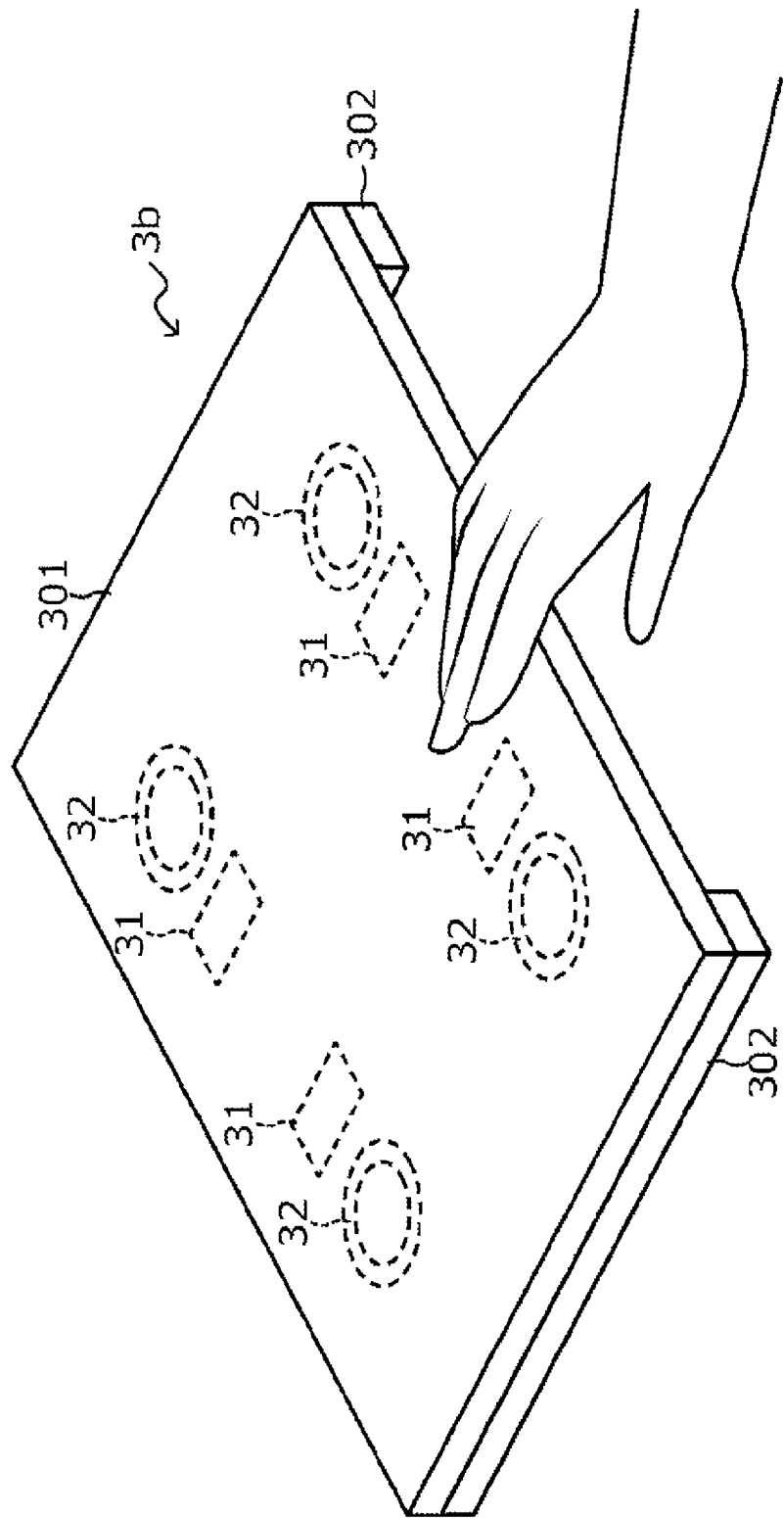
FIG. 12 is a diagram illustrating a third example of the environment installation-type vibration input/output device.

FIG. 12 is a diagram illustrating a third example of the environment installation-type vibration input/output device 3b.

In the vibration input/output device 3b illustrated in FIG. 12, the contact plate 301 is fixed by two fixing portions 302 similarly to the vibration input/output devices 3 and 3a illustrated in FIGS. 10 and 11. The vibration input/output device 3b includes a plurality of (four in the illustrated example) vibration sensors 31 and a plurality of (four in the illustrated example) vibrators 32 on the back surface of the contact plate 301.

By providing the plurality of vibration sensors 31, the contact position may be estimated based on the input intensity difference, and the sensation of movement of a vibration may be output to the vibrators 32 based on the input from each of the plurality of vibration sensors 31. In addition, the entire surface of the contact plate can be made to be shaken by providing a plurality of vibrators 32. Furthermore, by adjusting the vibration intensity and the time difference of each vibration according to a contact position of a communication partner, a sensation of movement of a contact target can be virtually expressed.

Figure 13:
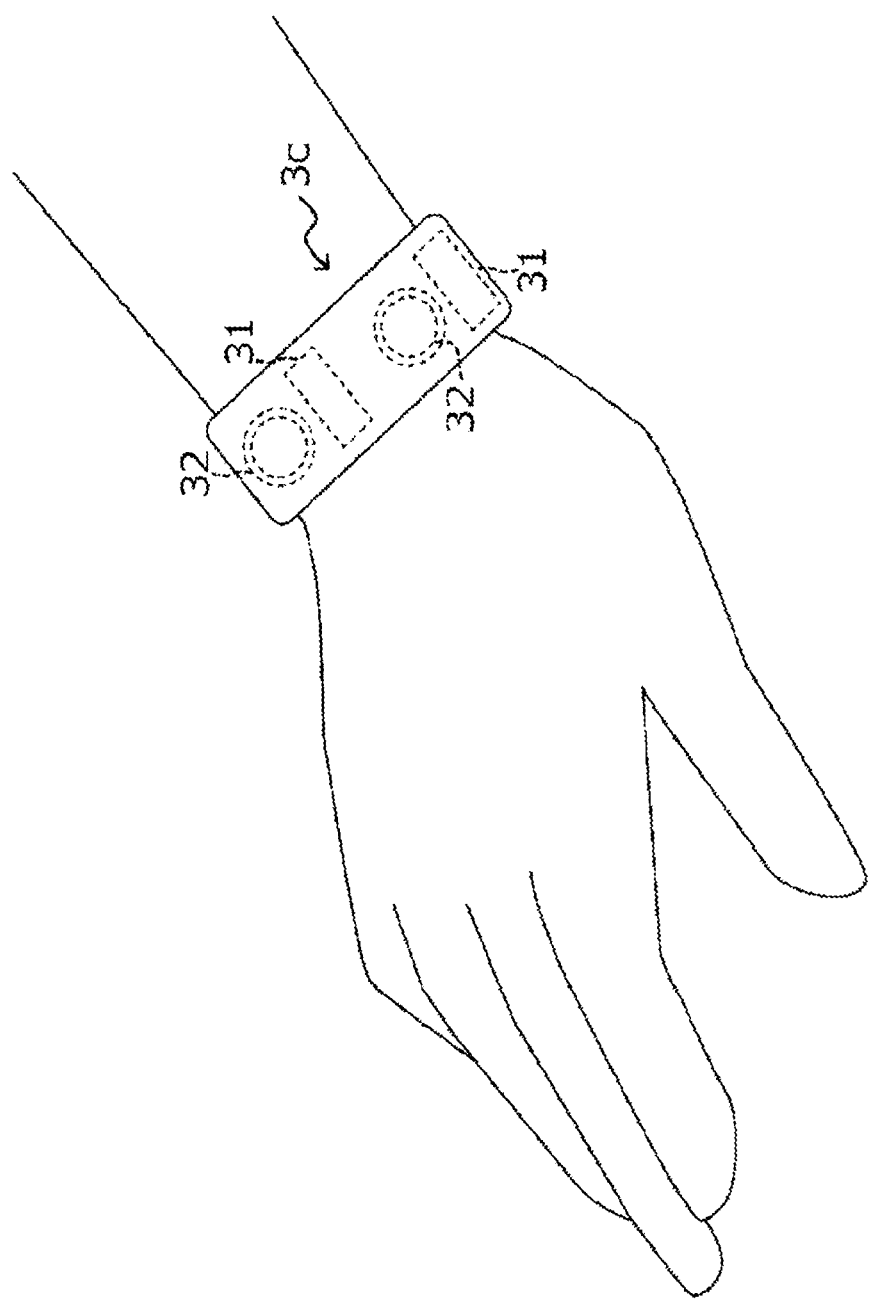
FIG. 13 is a diagram illustrating a wristband-type vibration input/output device.

FIG. 13 is a diagram illustrating a wristband-type vibration input/output device 3c.

The vibration input/output device 3c illustrated in FIG. 13 includes a plurality of vibration sensors 31 and a plurality of vibrators 32 on the inner surface of the wristband that a user wears on his/her wrist. Further, the vibration input/output device 3c may be various wearable devices that can be worn by a user. Although two vibration sensors 31 and two vibrators 32 are clearly illustrated in FIG. 13, a plurality of vibration sensors 31 and vibrators 32 may be provided to surround the wrist of a user, and for example, four vibration sensors 31 and four vibrators 32 may be provided at the top, bottom, left, and right sides.

The vibration sensors 31 are mounted near a wrist and measure a vibration propagated from a hand of a user by contact with an object. By using a plurality of vibration sensors 31, differences in vibration depending on parts of the arm can be acquired. The vibrators 32 are also worn near the wrist to present vibrations transmitted from the communication partner. By using a plurality of vibrators 32, differences in vibration depending on parts can be expressed.

Figure 14:
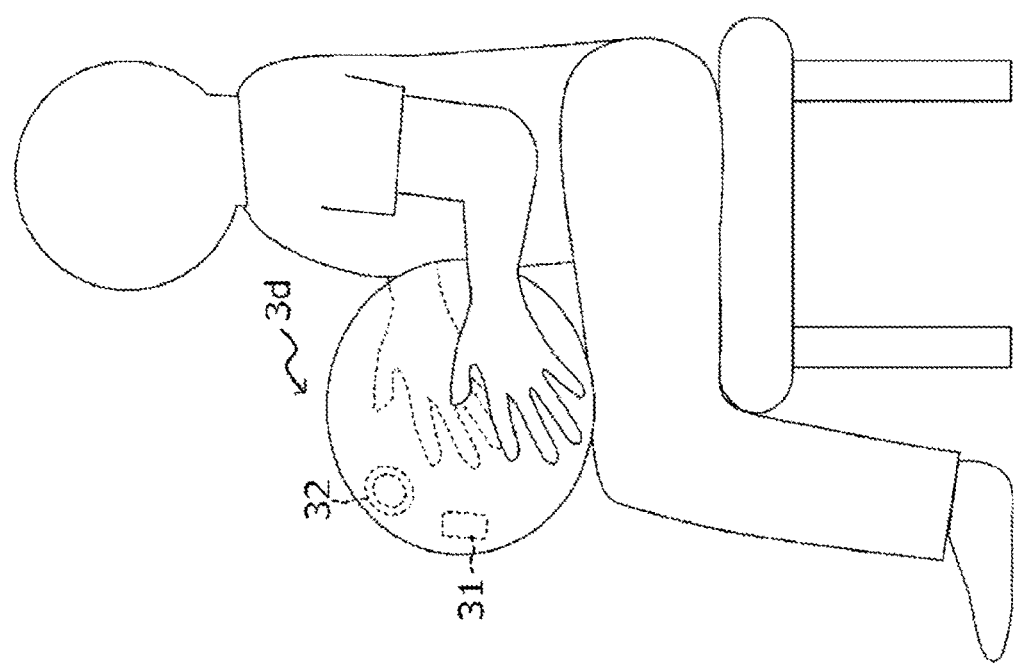
FIG. 14 is a diagram illustrating a body pillow-type vibration input/output device.

FIG. 14 is a diagram illustrating a body pillow-type vibration input/output device 3d.

In the vibration input/output device 3d illustrated in FIG. 14, a vibration sensor 31 and a vibrator 32 are disposed in a body pillow, a cushion, or the like that can be brought into contact with the body of the user or can be held by the user. Further, the number of vibration sensors 31 and vibrators 32 can be changed to any of various numbers. The vibration input/output device 3d is in contact with a large area of the user's abdomen, leg, or the like, and thus the vibration sensor 31 can measure the vibration of the user's body and the vibrator 32 can transmit the vibration to the user's body.

Further, the vibration sensor 31 and the vibrator 32 may be disposed in a hand-held controller as a device that can be held by the user.

Figure 15:
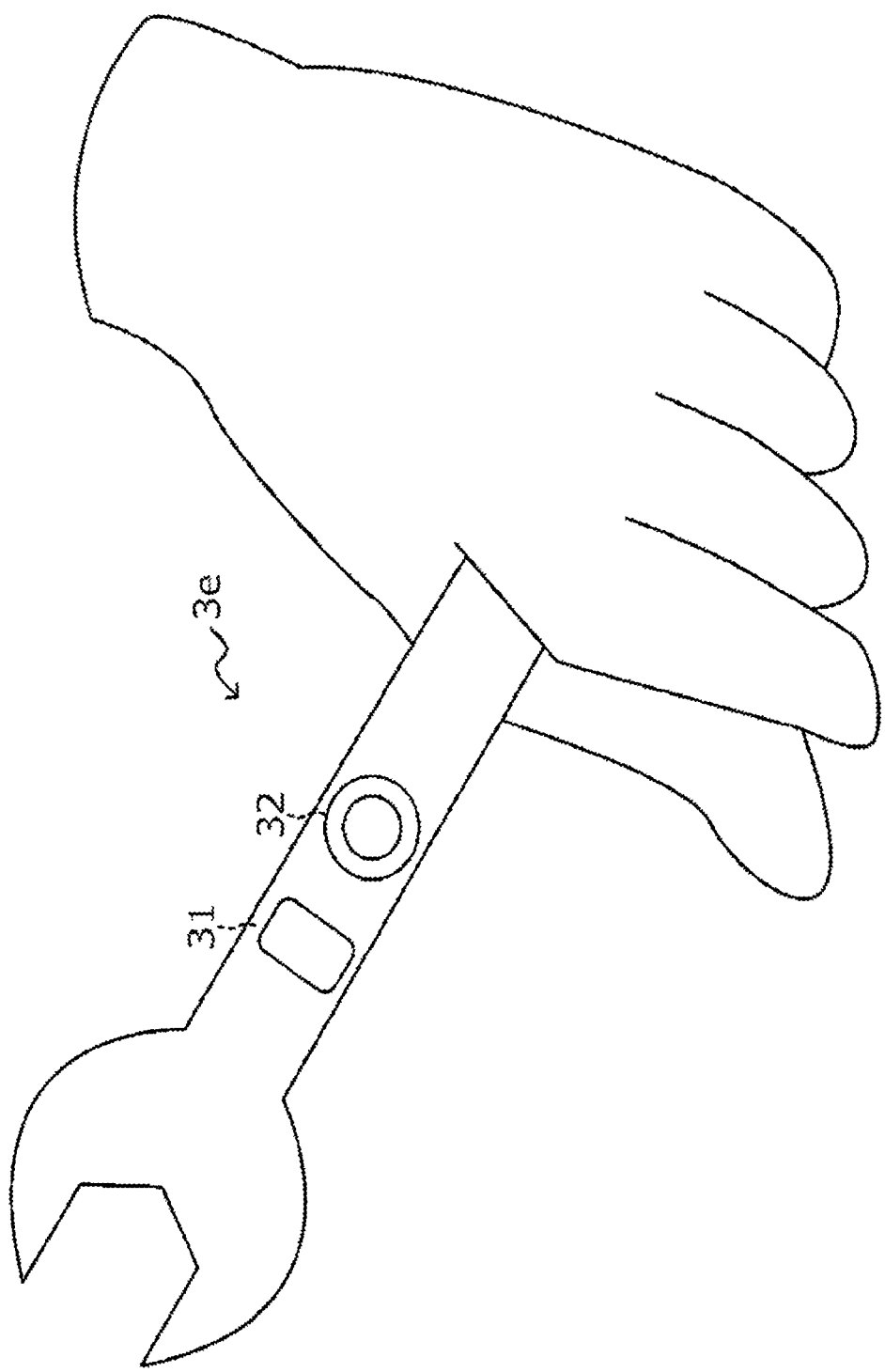
FIG. 15 is a diagram illustrating a tool-attached-type vibration input/output device.

FIG. 15 is a diagram illustrating a tool-attached-type vibration input/output device 3e.

In the vibration input/output device 3e illustrated in FIG. 15, a vibration sensor 31 and a vibrator 32 are disposed in a tool such as a wrench or a driver that can be held by a user. Further, the number of vibration sensors 31 and vibrators 32 can be changed to any of various numbers. A vibration propagated to a tool is measured by the vibration sensor 31, the hand is stimulated by the vibrator 32 attached to the tool, and a sensation of operation or the like is transmitted to a user at a remote place by transmitting the stimulation in both directions, and thus technical instructions or the like from a remote place can be carried out.

Further, in the vibration input/output devices 3 and 3a to 3e illustrated in FIGS. 10 to 15, at least one of sound, image, and light may be output simultaneously with the output of a converted signal from the vibrator 32.

[A-2] Terminal

Figure 16:
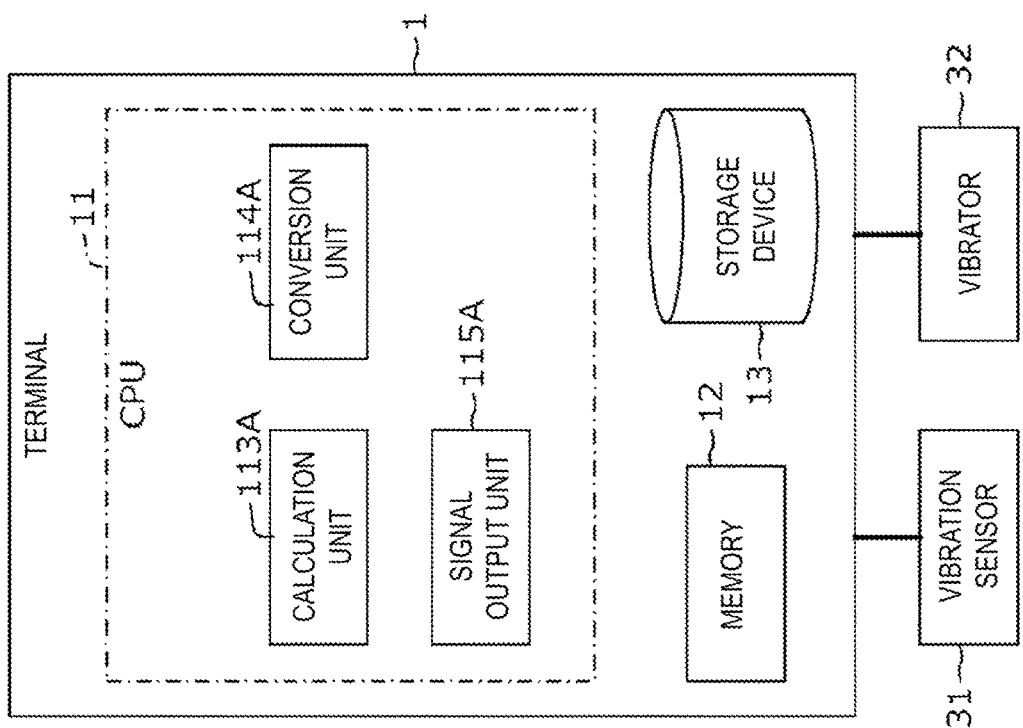
FIG. 16 is a block diagram schematically illustrating a configuration example of a terminal as an embodiment.

FIG. 16 is a block diagram schematically illustrating a configuration example of a terminal 1 as an embodiment.

The terminal 1 includes a central processing unit (CPU) 11, a memory 12, and a storage device 13.

The memory 12 is a storage device including a read only memory (ROM) and a random access memory (RAM).

The storage device 13 is a device that stores data in a readable and writable manner, and for example, a hard disk drive (HDD), a solid state drive (SSD), or a storage class memory (SCM) may be used as the storage device 13. The storage device 13 stores generated training data, learning models, and the like.

The CPU 11 is a processing device that performs various control and calculation operations, and realizes various functions by executing an operating system (OS) and programs stored in the memory 12. That is, the CPU 11 may function as a calculation unit 113A, a conversion unit 114A, and a signal output unit 115A as illustrated in FIG. 16.

The CPU 11 is an example of a computer and illustratively controls overall operations of the terminal 1. A device for controlling the overall operations of the terminal 1 is not limited to the CPU 11, and may be, for example, any one of an MPU, a DSP, an ASIC, a PLD, an FPGA, and a dedicated processor. In addition, the device for controlling the overall operations of the terminal 1 may be a combination of two or more of a CPU, an MPU, a DSP, an ASIC, a PLD, an FPGA, and a dedicated processor. Further, MPU is an abbreviation for micro processing unit, DSP is an abbreviation for digital signal processor, and ASIC is an abbreviation for application specific integrated circuit. In addition, PLD is an abbreviation for programmable logic device, and FPGA is an abbreviation for field programmable gate array.

The calculation unit 113A calculates perception information specified from a vibration measured by the vibration sensor 31. The calculation unit 113A may calculate, as perception information, an envelope curve specified from a vibration measured by the vibration sensor 31. The calculation unit 113A may calculate, as perception information, a subjective intensity of a stimulus from the waveform of a vibration measured by the vibration sensor 31. The calculation unit 113A may calculate, as perception information, a perceived intensity (in other words, an energy of a signal) specified from a vibration measured by the vibration sensor 31. The calculation unit 113A may divide the signal related to the vibration measured by the vibration sensor 31 into predetermined time intervals and calculate the perceived intensity in each of the predetermined time interval divisions.

The conversion unit 114A converts the signal related to the vibration into a predetermined frequency while maintaining the perception information calculated by the calculation unit 113A. The conversion unit 114A may convert the signal into a different frequency from the resonance frequency of the housing of the vibration input/output device 3. While maintaining the envelope curve calculated by the calculation unit 113A, the conversion unit 114A may output the signal related to the vibration as an amplitude modulated signal obtained by converting the predetermined frequency into a carrier frequency. The conversion unit 114A may convert the signal related to the vibration into a predetermined frequency by using a predetermined equivalent subjective intensity map so as to maintain the subjective intensity calculated by the calculation unit 113A. The conversion unit 114A may convert the signal related to the vibration to have a waveform having a different frequency while maintaining the perceived intensity calculated by the calculation unit 113A. The conversion unit 114A may adjust the perceived intensity and convert the waveform of a signal in a specific frequency band of the frequency components of the signal, and convert a signal outside the specific frequency band to have a waveform having a different frequency while maintaining the perceived intensity of the signal. The conversion unit 114A may adjust the perceived intensity and convert the waveform of a signal extracted based on a specific signal feature amount, and may convert the waveform of a signal not extracted in the specific feature amount into a waveform having a different frequency while maintaining the perceived intensity. The conversion unit 114A may attenuate a specific frequency band by filtering so as to curb loopback of the vibration output from the vibrator 32. Further, the filtering may be realized by the band-stop filter 2132 illustrated in FIGS. 3 to 5.

The signal output unit 115A outputs the converted signal converted by the conversion unit 114A to the vibrator 32 of another vibration input/output device 3 as an output vibration. The signal output unit 115A outputs the amplitude modulated signal converted by the conversion unit 114A to the vibrator 32 of the other vibration input/output device 3.

Further, among the functions as the calculation unit 113A, the conversion unit 114A, and the signal output unit 115A, any one of a combination of only the calculation unit 113A, a combination of the calculation unit 113A and the conversion unit 114A, and a combination of the calculation unit 113A, the conversion unit 114A, and the signal output unit 115A may be provided in the terminal 1 in the transmission end. In addition, among the functions as the calculation unit 113A, the conversion unit 114A, and the signal output unit 115A, any one of a combination of only the signal output unit 115A, a combination of the conversion unit 114A and the signal output unit 115A, and a combination of the calculation unit 113A, the conversion unit 114A, and the signal output unit 115A may be provided in the terminal 1 in the reception end.

[A-3] ISM

FIGS. 17(a) to 17(c) are graphs for briefly explaining the ISM process used for the perceived intensity distribution process illustrated in FIG. 1.

Figure 17:
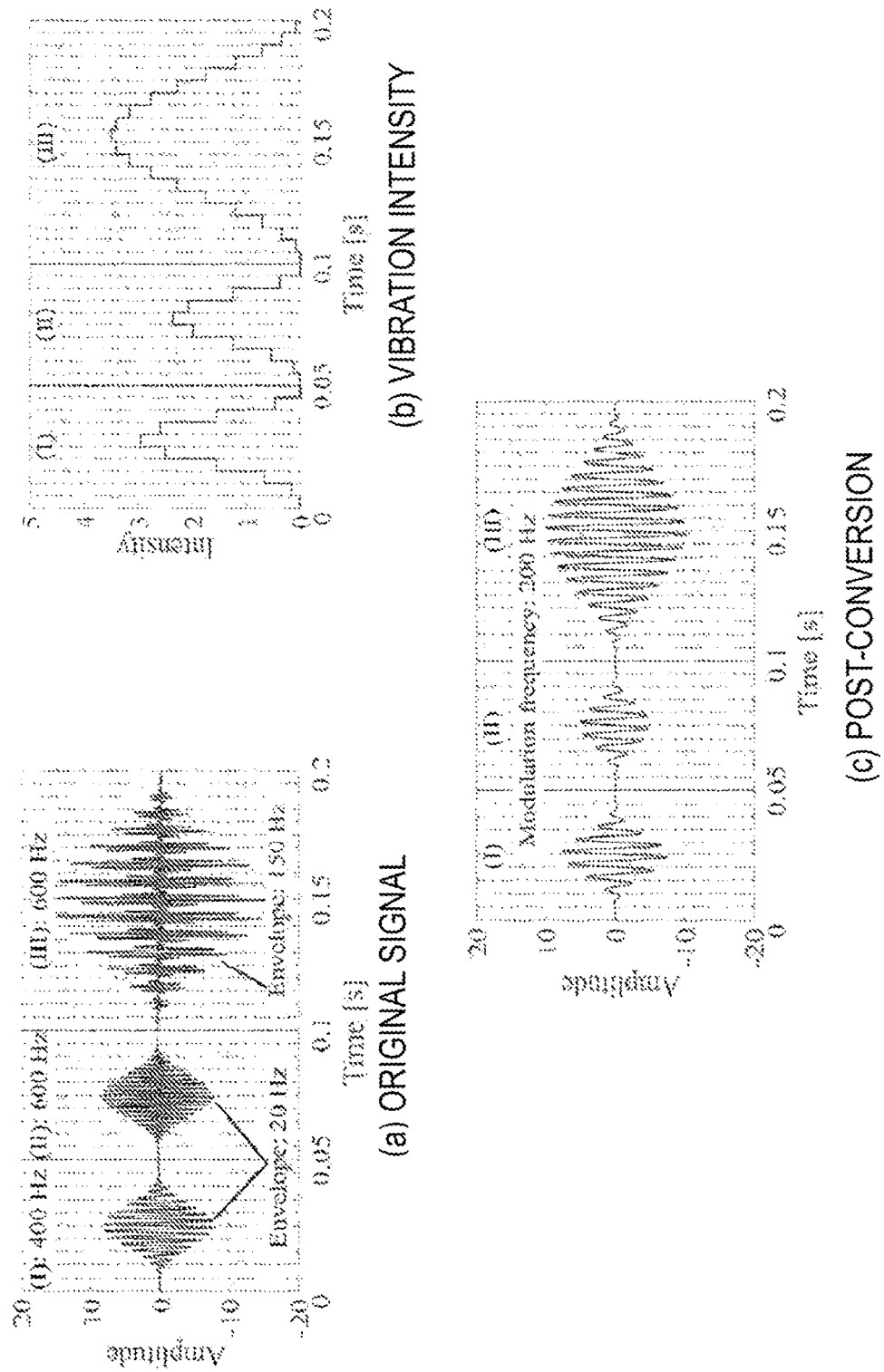
FIGS. 17(a) to 17(c) are graphs for briefly explaining ISM processing.

ISM is a method of modulating high-frequency vibration to low-frequency vibration while maintaining the tactile sensation. The original signal shown in FIG. 17(a) is converted to calculate the vibration intensity for each segment shown in FIG. 17(*b*). Then, the converted waveform shown in FIG. 17(*c*) is generated with the vibration intensity maintained.

Although the vibration has a waveform of 200 Hz after conversion while it is a vibration of 400 to 600 Hz before conversion in FIG. 17, any frequency can be selected as the waveform after conversion.

When a high-frequency component signal is generated, a vibration waveform equivalent to the distributed perceived intensity is generated. In a simple manner, since the waveforms of each of the vibrators 32 have the same frequency, the original waveform may be multiplied by a gain value obtained from a distribution coefficient to drive the vibrators (the same method as that for a low-frequency component described later). However, in general, the vibrators 32 for tactile sense have a narrow response frequency band, and it is difficult for the vibrators to generate a predetermined vibration waveform as it is. Furthermore, when an acoustic signal is used as a waveform of a vibration source, since the acoustic signal includes a frequency in an audible range, there is a problem that noise is generated when the vibration source is driven by the vibrator 32.

Thus, a waveform is converted into an amplitude modulated wave having an appropriate carrier frequency so as to generate the distributed perceived intensity $I_k$. Thus, the carrier frequency of the generated signal becomes one. A carrier frequency can be selected in accordance with the frequency response characteristics of the vibrators. A carrier frequency in the range of 150 to 400 Hz is appropriate in consideration of human perception characteristics for high-frequency vibration.

In consideration of human perception characteristics with respect to high-frequency vibration, by focusing on a vibration energy that is correlated with the human perception characteristics rather than on a waveform itself in a high-frequency band, the frequency band is changed by replacing the waveform with another waveform having an equivalent vibration energy.

A predetermined continuous vibration signal can be converted into a predetermined signal waveform by time-dividing the vibration signal at an appropriate interval in consideration of the human perception characteristics and converting the vibration signal into a vibration energy for each divided segment while equally maintaining a human tactile sense or to make the human feel a high-frequency band that is hardly felt.

By appropriately selecting the frequency of the vibrations after the conversion, it is possible to efficiently drive the vibrators in accordance with the response range of the vibrators, to reduce auditory noise, or to convert the vibration into a predetermined sound source.

A human is said to perceive vibration up to about 1 kHz. For this reason, vibration of 1 kHz or higher is often ignored. On the other hand, even if the vibration of 1 kHz or higher, it is known that the envelope curve components of the vibration can be perceived, in the case of an amplitude modulated wave whose amplitude fluctuates in a band that can be sensed by humans.

On the other hand, a vibration energy model is known as a human perception characteristic with respect to high-frequency vibration equal to or higher than 100 Hz of vibration. From this fact, it is known that, even if the carrier frequency of the amplitude modulated wave is replaced while the high-frequency vibration energy is maintained, the vibration cannot be discriminated. However, even if the vibration energy is maintained, the envelope component of the vibration may be perceived as a difference in tactile information as described above, and the perception range thereof has not been investigated. In addition, although a method of converting a signal based on a vibration energy in a time division manner has been devised, a method of maintaining low-frequency components has not been studied.

Figure 18:
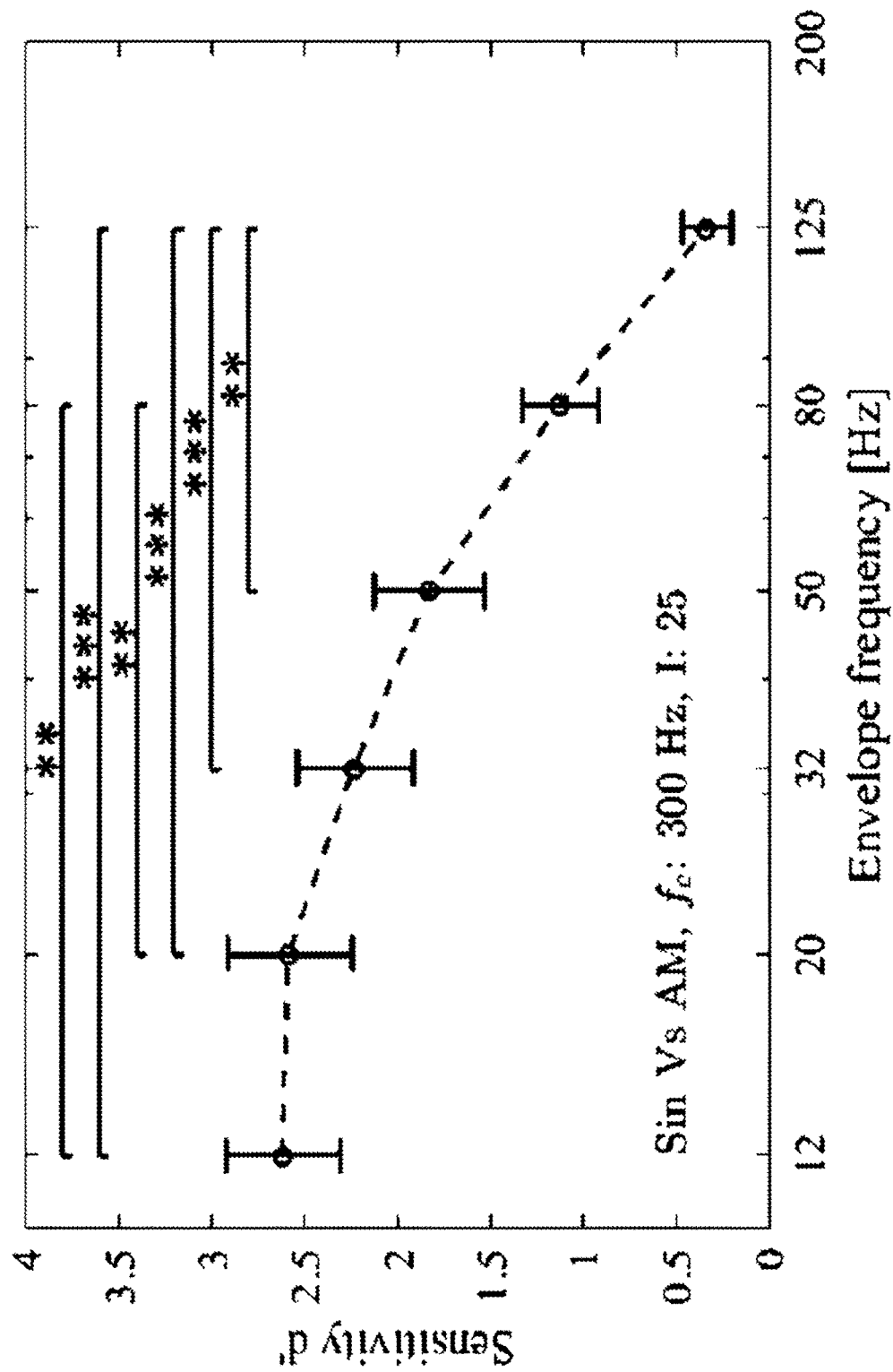
FIG. 18 is a graph showing discriminability of vibrations with respect to a human.

FIG. 18 is a graph showing discriminability of vibrations to a human. FIG. 19 illustrates sample waveforms of vibrations used in a forced tri-choice discrimination experiment performed to determine the discriminability shown in the graph of FIG. 18.

The graph shown in FIG. 18 is obtained by investigating perceptual discrimination characteristics of humans while maintaining a vibration energy on the premise of a vibration energy model known in the related art. Reference symbols B1 and B2 in FIG. 19 indicate the same waveform, and reference symbol B3 in FIG. 19 indicates a different waveform. A test subject is asked to compare the constant amplitude vibrations indicated by the reference symbols B1 and B2 in FIG. 19 with the amplitude modulated stimulus indicated by the reference symbol B3 and to answer to which one is an amplitude modulated wave. In FIG. 18, the percentage of correct answers obtained in the forced tri-choice discrimination experiment is represented by Sensitivity (d: d-prime) which is a discrimination performance index based on the signal detection theory, and when d' is 1 or less, it means that the percentage of correct answers falls below about 60%.

According to the graph shown in FIG. 18, the upper limit of the frequencies at which envelope curve components can be discriminated is about 80 to 125 Hz. In addition, it is not necessary to maintain the envelope components that are equal to or higher than the upper limit of the frequencies, and it indicates that the stimulus cannot be discriminated if the carrier frequency of the amplitude modulated wave is replaced while maintaining the vibration energy.

As described above, even if the vibration energy is maintained, when the energy fluctuates in a low-frequency range, the variation may be perceived as a difference in tactile information, and the perception range is not investigated. Therefore, based on the fact that the upper limit value of the variation of the perceivable low frequency is found to be about 80 to 125 Hz, a conversion of the vibration energy is performed while low-frequency components are maintained by two measures (refer to measures [1] and [2] described later).

Figure 20:
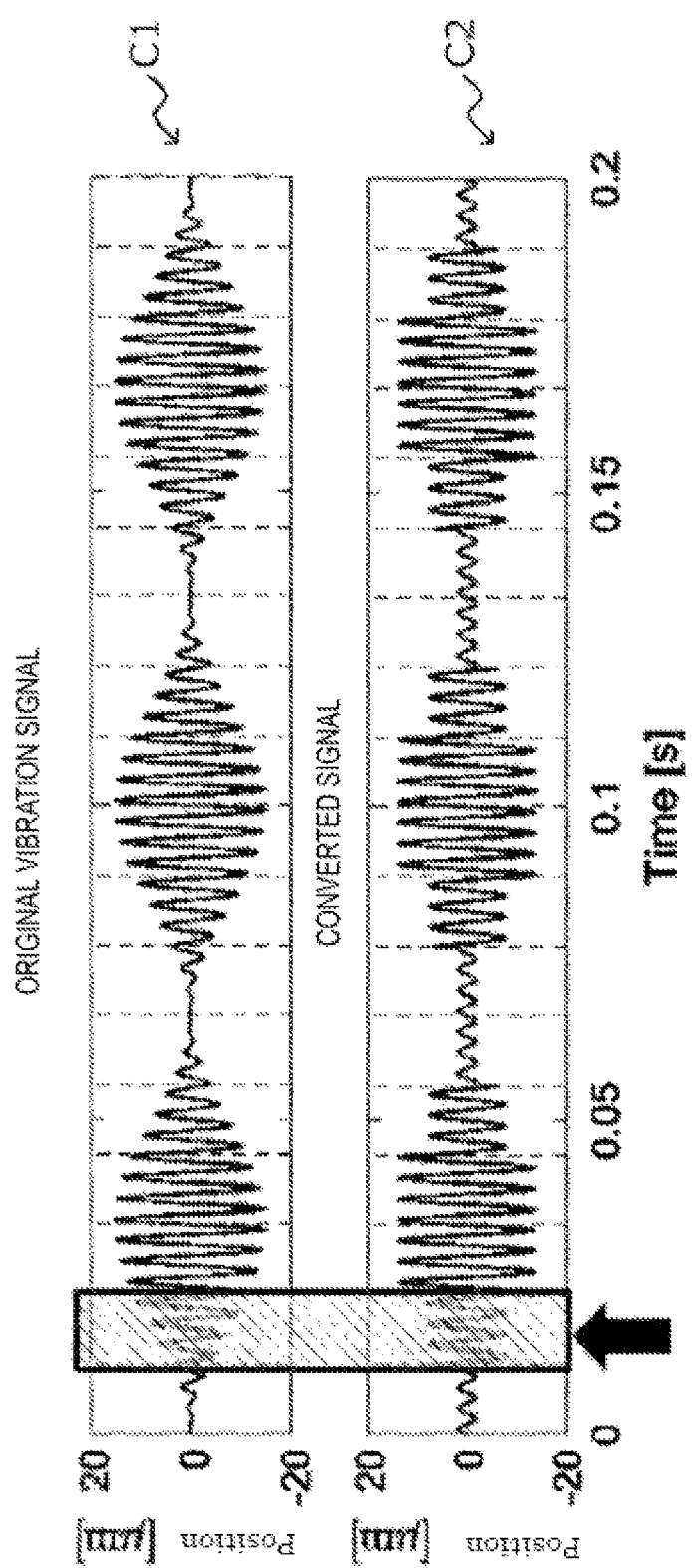
FIG. 20 shows graphs showing waveforms of signals before and after conversion for each segment by the terminal illustrated in FIG. 16.

FIG. 20 shows graphs showing waveforms of signals before and after conversion for each segment by the terminal 1 illustrated in FIG. 16.

Since humans perceive a high frequency based on a vibration energy rather than the waveform itself, the vibrations are sensed as the same feeling if the vibration energy is maintained. However, in a case that the variation of the vibration energy occurs at about 80 to 125 Hz or lower, it is necessary to reproduce the variation of the vibration energy.

Therefore, in an example of the present embodiment, as means for maintaining the variation of the vibration energy at a predetermined frequency (for example, about 80 to 125 Hz) or lower, for example, the vibration is time-divided in a section of about 80 to 200 Hz, the vibration energy is obtained for each segment, and the vibration is replaced with a vibration having a different carrier frequency.

In the example illustrated in FIG. 20, the original vibration signal indicated by reference symbol C1 and the converted signal indicated by reference symbol C2 are converted so that the energy of the converted signal is equal to the energy of the original vibration signal in the same time segment.

The range of the time division (in other words, the division width) may be set to such an extent that an energy variation of 80 to 125 Hz or lower can be expressed (in other words, an extent that the peaks of the variations match) (measure [1]). Although the frequency of the division width may be 80 to 125 Hz or higher, when the division width is too short, the estimation accuracy of the vibration energy having a cycle longer than the division width deteriorates. For this reason, with the following measure [2], the waveform of the vibration whose energy cannot be estimated is output as it is.

In addition, a component having a frequency equal to or lower than a predetermined frequency may be extracted and presented as a stimulation vibration as it is (measure [2]). Note that, although the predetermined frequency may be a frequency from 80 to 125 Hz or higher, components of the predetermined frequency or more may be represented by the energy control unit 113 of the second signal component. As a result, it is possible to have flexibility in the frequency selection. However, if the predetermined frequency is set to an excessively high frequency, a problem of noise may occur or a vibration device for a wide band may be required.

According to the above-described measures [1] and [2], the predetermined frequency may be about 80 to 400 Hz. 400 Hz is an upper limit from the point of view of the noise problem and the capability of a vibration device.

The setting of the predetermined frequency also involves selection of a carrier frequency at which the vibration is converted. Since the peak of the vibration frequency at which the human perception sensitivity is improved is around 200 to 250 Hz, the practical frequency is around 150 to 400 Hz as the carrier frequency at which the sensitivity is improved and noise is not generated. The carrier frequency may be a constant multiple of the division width. In addition, a plurality of different frequencies may be used for the carrier frequency, and a high-frequency band equal to or higher than 400 Hz may be included.

In addition, the predetermined frequency for dividing a low frequency and a high frequency and the frequency of the division width for calculating an energy may not necessarily coincide with each other.

The correction energy, which is a vibration energy corrected to improve human perceptibility, can be expressed by the following formula.

$$I_{pc} = \left(\frac{A^2}{T_f^2}\right)^{b_f} \quad [\text{Math 3}]$$

A represents the amplitude of a separated basis signal $g_k$. $T_f$ represents an amplitude threshold, which is the minimum amplitude that a human can perceive with a signal of a frequency f. $b_f$ represents an exponent value and is non-linear for the signal of the frequency f.

Figure 21:
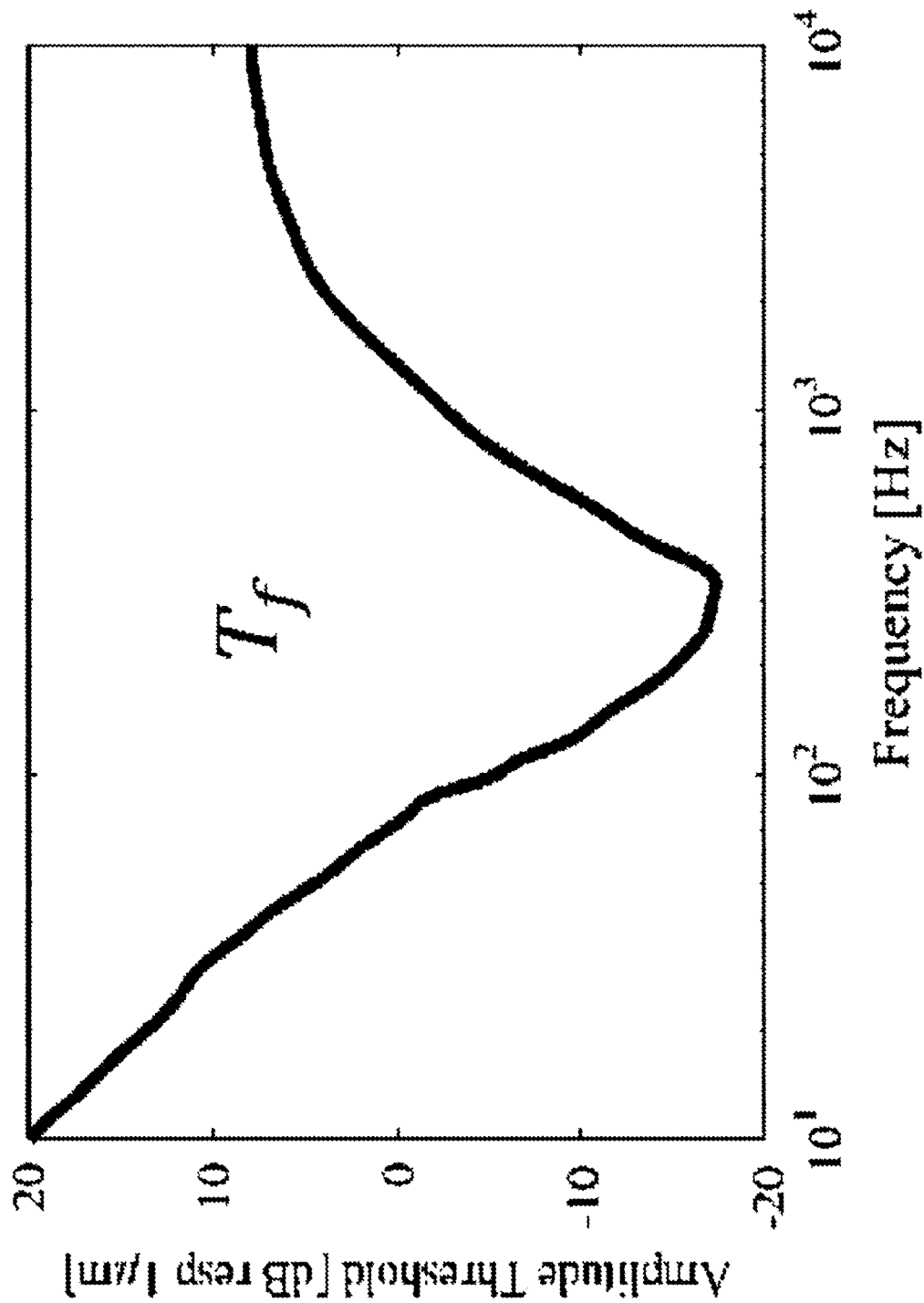
FIG. 21 is a graph showing an amplitude threshold $T_f$ used for calculation of a correction energy.

FIG. 21 is a graph showing an amplitude threshold $T_f$ used for calculation of a correction energy.

As shown in FIG. 21, the amplitude threshold varies depending on frequencies, and in the range of about 102 to 103 Hz, even a relatively small amplitude can be sensed by a human, but in the other ranges, only a relatively large amplitude can be sensed by a human.

Figure 22:
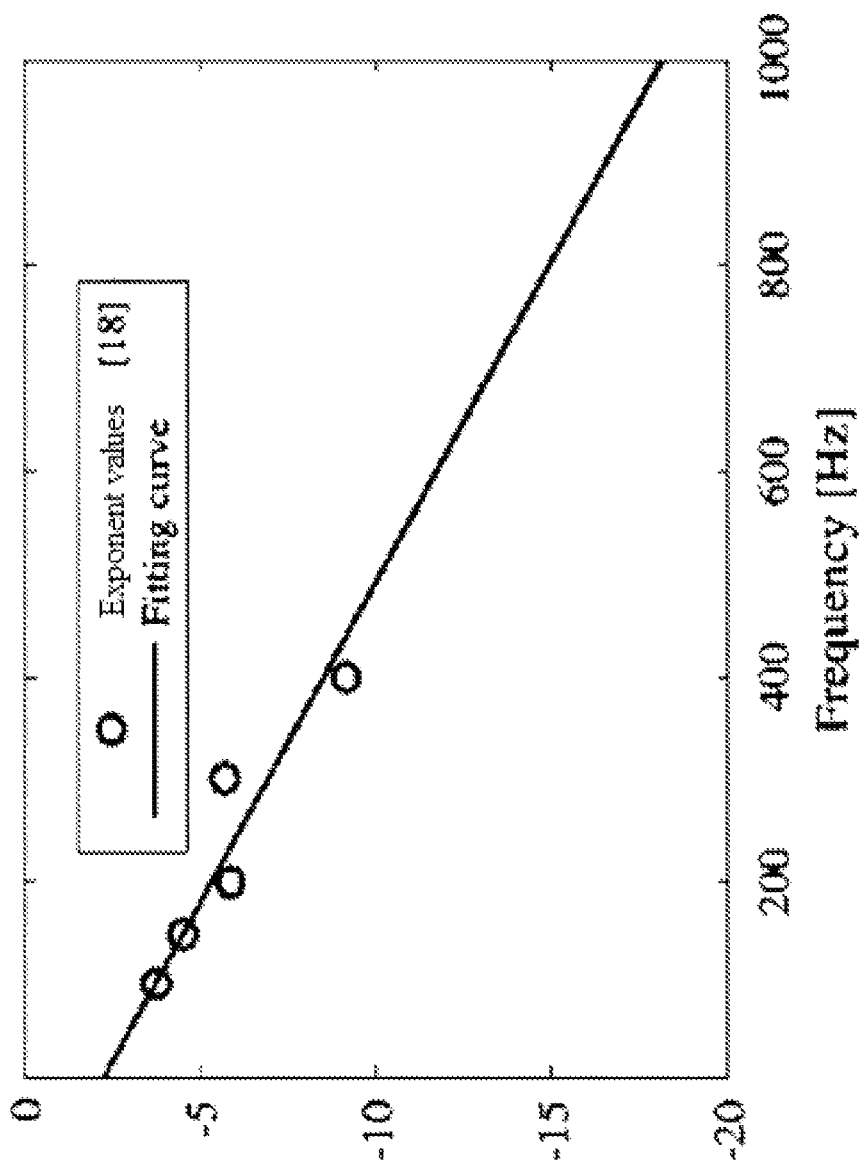
FIG. 22 is a graph showing an exponent threshold b used for calculation of a correction energy.

FIG. 22 is a graph showing an exponent value $b_f$ used for calculation of a correction energy.

The exponent value $b_f$ in FIG. 22 is an example of using a value obtained by linearly interpolating the exponent value $b_f$ reported in the related art which is equal to or less than 400 Hz.

Figure 23:
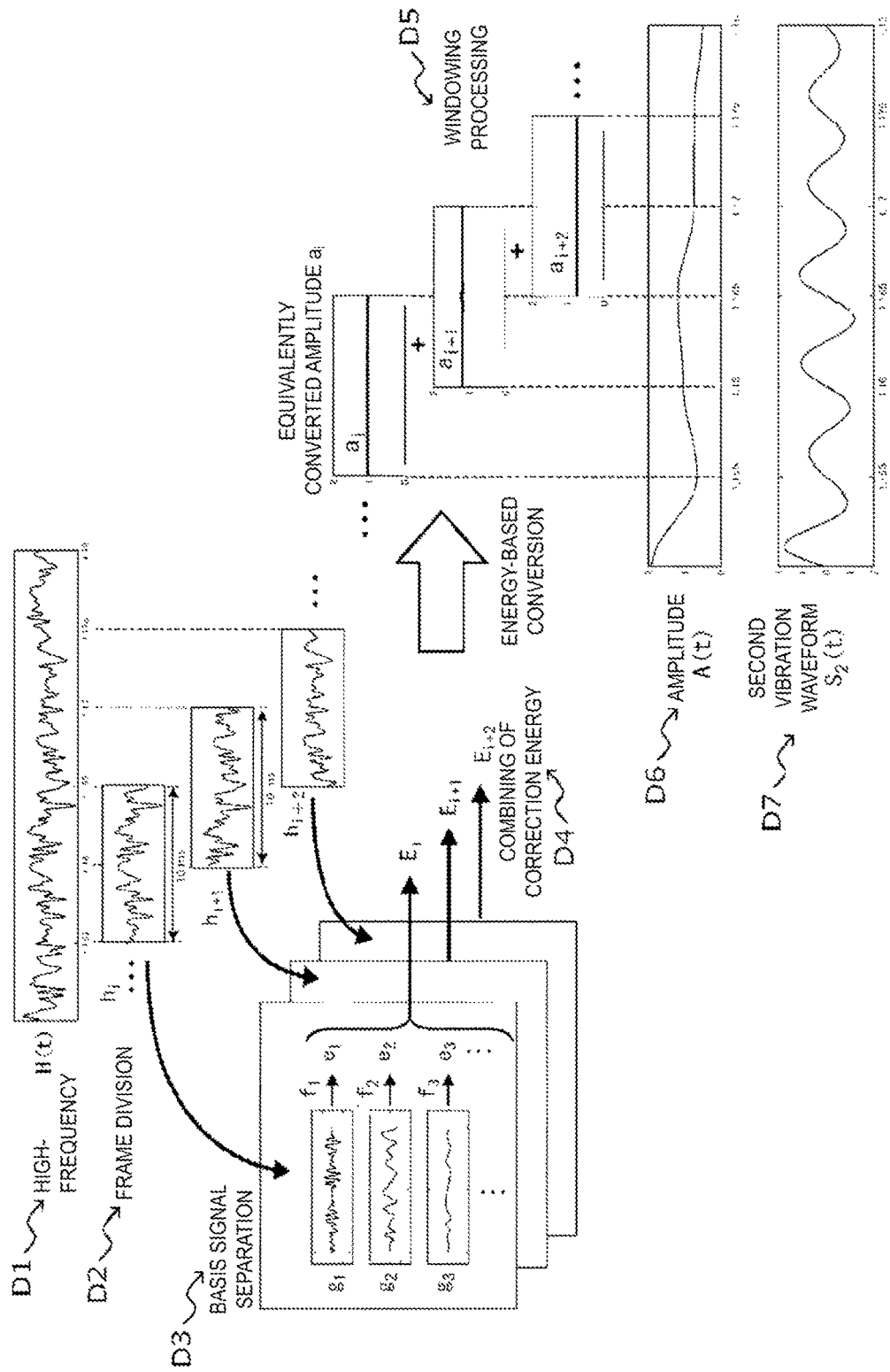
FIG. 23 is a diagram for describing use of a window function by the terminal illustrated in FIG. 16.

FIG. 23 is a diagram for describing use of a window function by the terminal 1 illustrated in FIG. 16.

As indicated by reference numeral D1, a high-frequency signal H(t) is input. As indicated by reference numeral D2, the high-frequency signal H(t) is divided into signals $h_i$, $h_{i+1}$, $h_{i+2}$, and the like for each of frames i, i+1, i+2, and the like, respectively. As indicated by reference numeral D3, the signal h of each divided frame is separated into a plurality of basis signals $g_1$, $g_2$, $g_3$, and the like. As indicated by reference numeral D4, based on frequencies $f_1$, $f_2$, $f_3$, and the like of the basis signals $g_1$, $g_2$, $g_3$, and the like, scalar values $E_i$, $E_{i+1}$, $E_{i+2}$, and the like obtained by combining the correction energy of all of the basis signals $g_1$, $g_2$, $g_3$, and the like are output. As indicated by reference numeral D5, the scalar values $E_i$, $E_{i+1}$, $E_{i+2}$, and the like of the vibration energy calculated for each frame i are converted into vibration waveforms having the same vibration energy but different carrier frequencies, and amplitudes $a_i(t)$, $a_{i+1}(t)$, $a_{i+2}(t)$, and the like of the waveforms are subjected to windowing processing using a window function. As indicated by reference numeral D6, the first to N-th frames are combined, and the amplitude A(t) of the vibration waveform is output. As indicated by reference numeral D7, a second vibration waveform $S_2(t)$ having the carrier frequency with the amplitude A(t) is output.

Figure 24:
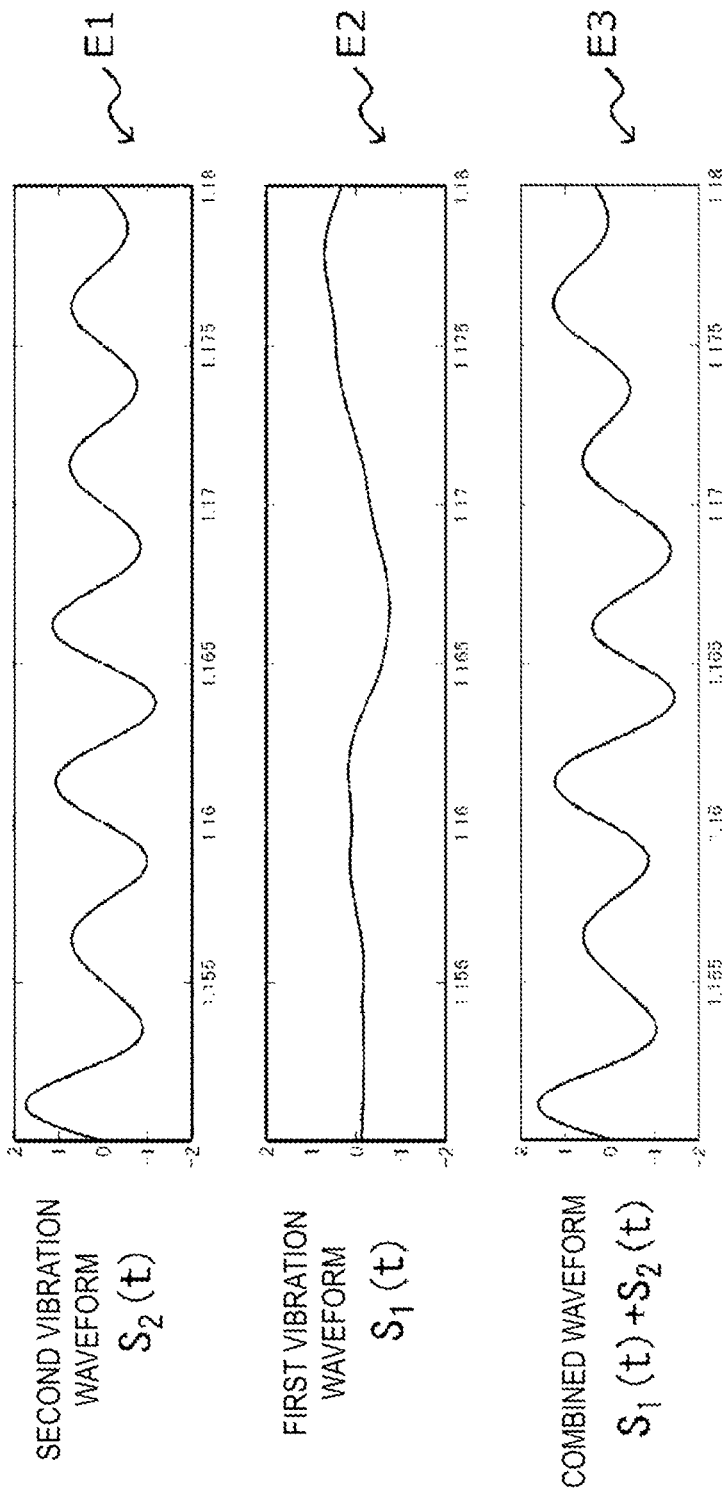
FIG. 24 shows graphs for explaining an example of combination of a low frequency and a high frequency by the terminal illustrated in FIG. 16.

FIG. 24 shows graphs for explaining an example of combination of a low frequency and a high frequency by the terminal 1 illustrated in FIG. 16.

A second vibration waveform $S_2(t)$ indicated by reference symbol E1 generated from a high-frequency signal H(t) using the window function of FIG. 23 is combined with a first vibration waveform $S_1(t)$ indicated by reference symbol E2 obtained by outputting a low-frequency signal L(t) as it is. As a result, a combined waveform $S_1(t)+S_2(t)$ indicated by reference numeral E3 is output.

Figure 25:
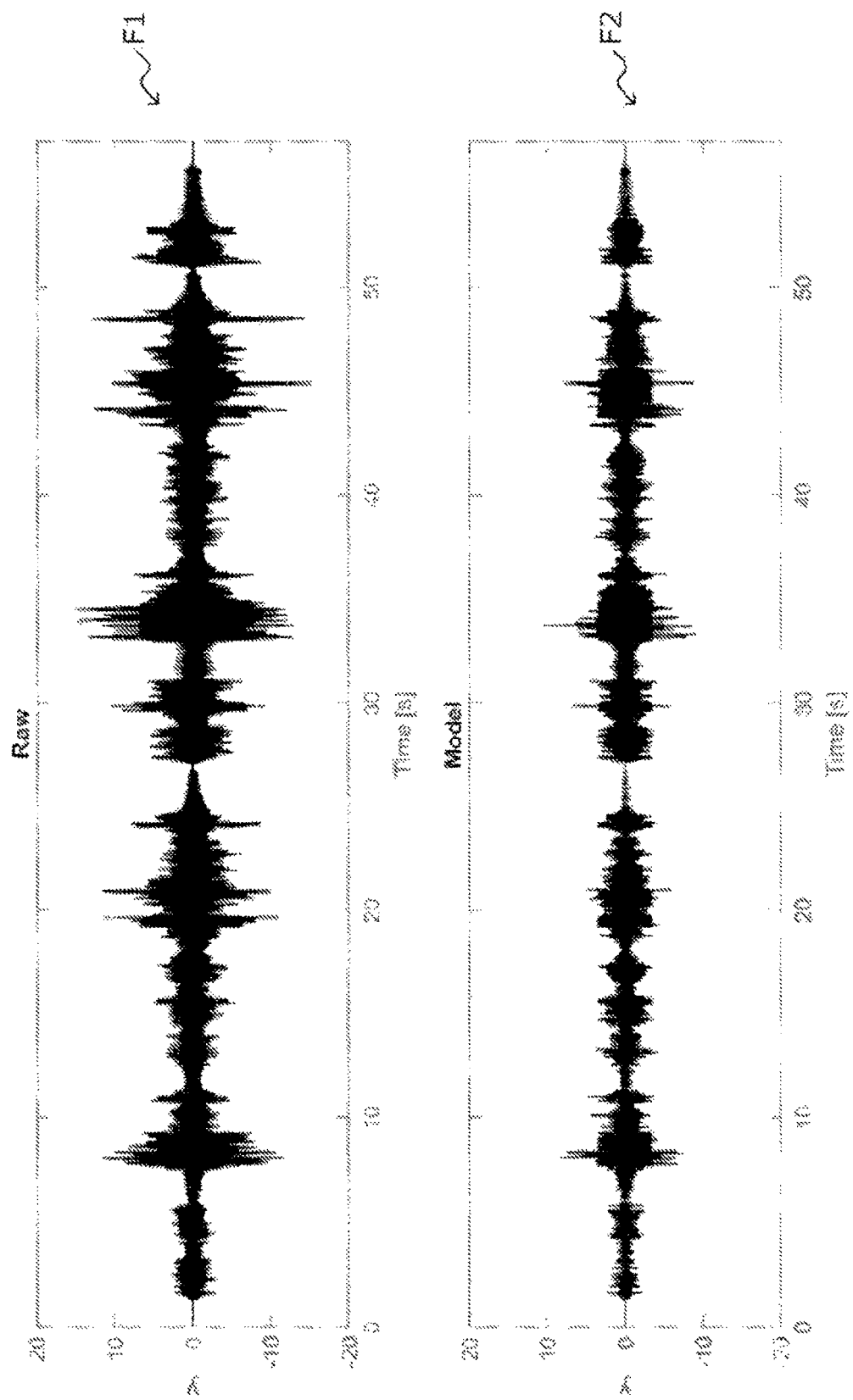
FIG. 25 shows graphs showing specific examples of waveforms of signals before and after conversion by the terminal illustrated in FIG. 16.

FIG. 25 shows graphs showing specific examples of waveforms of signals before and after conversion by the terminal 1 illustrated in FIG. 16.

In FIG. 25, a waveform before conversion (see reference symbol F1) and a waveform after conversion (see reference symbol F2) of a violin sound are represented by amplitudes at each time.

With respect to the sound of high-frequency vibration such as a violin sound, auditory noise is largely generated due to a tactile vibration in the related art, and when a low-pass filter is applied thereto, the vibration that can be recognized by a human disappears. Thus, the correction energy is calculated so that the waveform becomes a single wavelength having a low carrier frequency at each time.

Figure 26:
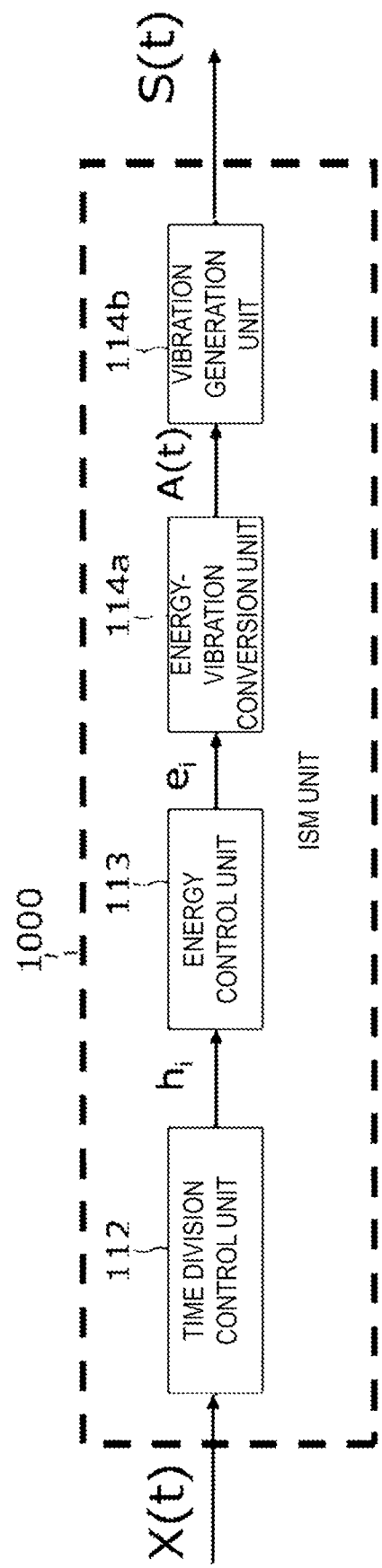
FIG. 26 is a block diagram for describing a functional configuration example of an ISM unit of the terminal illustrated in FIG. 16.

FIG. 26 is a block diagram for describing a functional configuration example of an ISM unit 1000 of the terminal 1 illustrated in FIG. 16.

The ISM unit 1000 functions as the time division control unit 112, the energy control unit 113, an energy-vibration conversion unit 114a, and a vibration generation unit 114b. In the present embodiment, the ISM unit 1000 controls a vibration including high-frequency components equal to or higher than about 100 Hz made by a vibrator 32 by using a signal. Techniques for controlling vibrations including high-frequency components equal to or higher than 100 Hz according to the present disclosure are collectively called ISM.

The time division control unit 112 time-divides a signal X(t) of a vibration including high-frequency components equal to or higher than about 100 Hz into N frames, and inputs the signal $h_i$ of the time-divided i-th frame to the energy control unit 113. Further, the number of frames N may be determined based on a predetermined cycle and an overlap rate of windowing processing.

The energy control unit 113 calculates a correction energy $e_i$ for the signal $h_i$ of the i-th frame and inputs the calculated correction energy to the energy-vibration conversion unit 114a.

The energy-vibration conversion unit 114a generates a signal A(t) obtained by combining correction energies $e_1$ to $e_N$ of the first to N-th frames and inputs the signal A(t) to a second vibration generation unit 114b.

The vibration generation unit 114b outputs a signal waveform S (t) based on the combined signal A(t).

Figure 27:
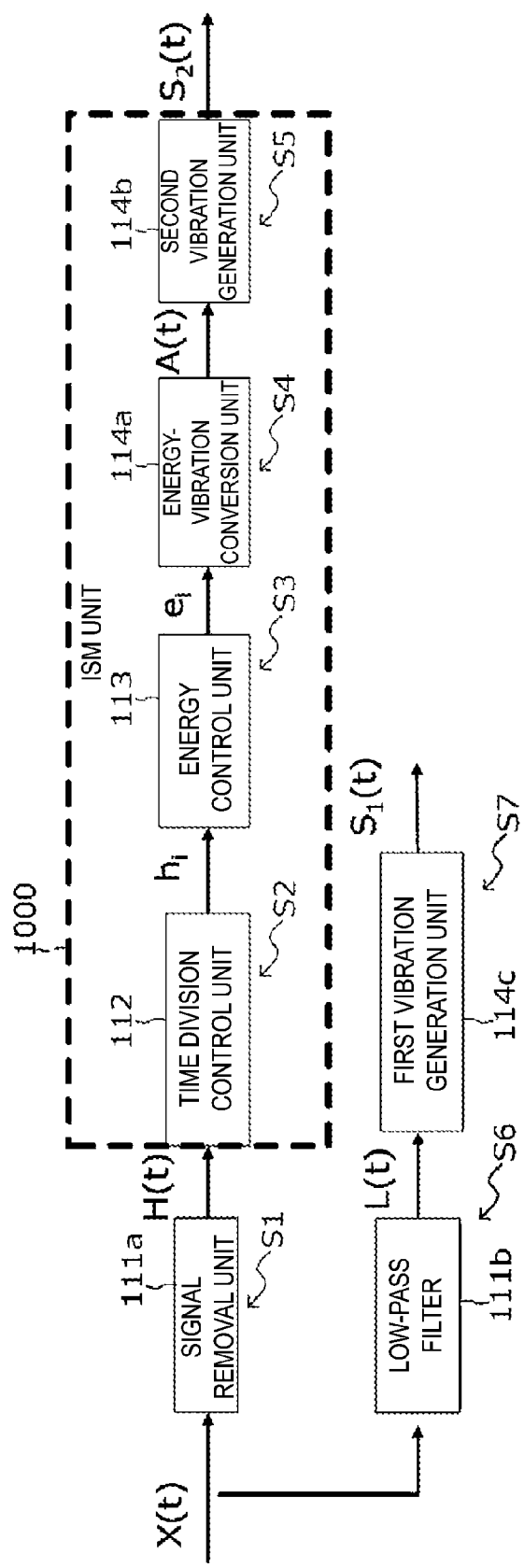
FIG. 27 is a block diagram for describing a first example of a vibration waveform generation process of the terminal illustrated in FIG. 16.

A first example of a vibration waveform generation process by the terminal 1 illustrated in FIG. 16 will be described with reference to the block diagram (steps S1 to S7) illustrated in FIG. 27.

The signal removal unit 111a removes components equal to or lower than a predetermined frequency from the acquired signal X(t) before a conversion to generate a high-frequency signal H(t), and inputs the high-frequency signal H(t) to the time division control unit 112 (step S1).

The time division control unit 112 time-divides the high-frequency signal H(t) into N frames, and inputs the signal $h_i$ of the time-divided i-th frame to the energy control unit 113 (step $S_2$). Further, the number of frames N may be determined based on a predetermined cycle and an overlap rate of windowing processing.

The energy control unit 113 calculates a correction energy $e_i$ for the signal $h_i$ of the i-th frame and inputs the calculated correction energy to the energy-vibration conversion unit 114a (step S3).

The energy-vibration conversion unit 114a generates a signal A(t) obtained by combining correction energies $e_1$ to $e_N$ of the first to N-th frames and inputs the signal A(t) to the second vibration generation unit 114b (step S4).

The second vibration generation unit 114b outputs a second vibration waveform $S_2(t)$ based on the combined signal A(t) (step S5).

On the other hand, the low-pass filter 111b inputs a low-frequency signal L(t) obtained by filtering components equal to or lower than the predetermined frequency from the acquired signal X(t) before a conversion to the first vibration generation unit 114c (step S6).

The first vibration generation unit 114c outputs the first vibration waveform $S_1(t)$ based on the low-frequency signal L(t) (step S7).

Next, the details of the energy control process indicated in step S3 of FIG. 27 will be described with reference to the block diagram (steps S11 to S14) illustrated in FIG. 28.

Figure 28:
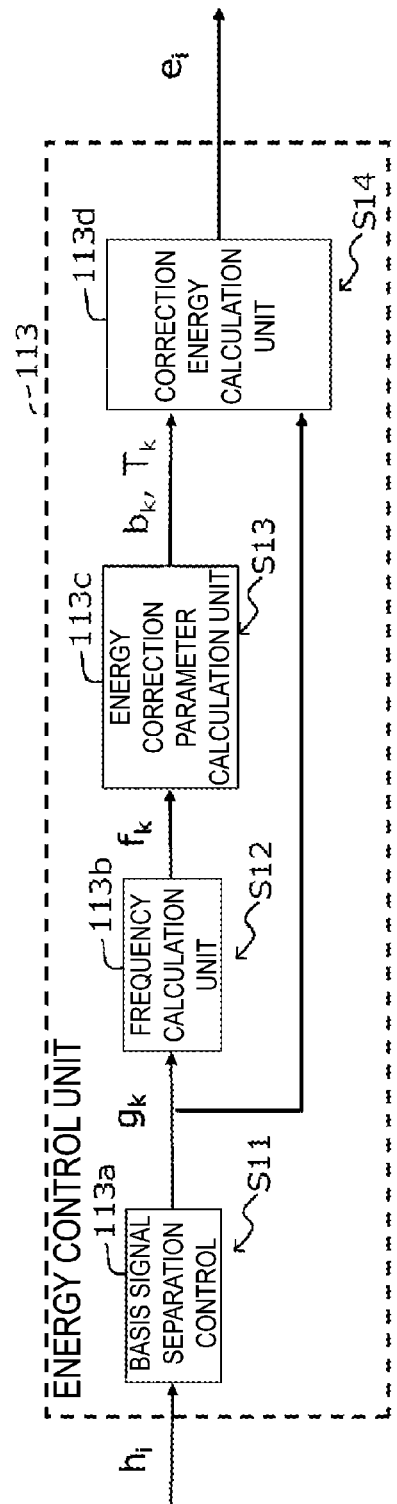
FIG. 28 is a block diagram for describing details of an energy control process illustrated in FIG. 26.

As illustrated in FIG. 28, the energy control unit 113 functions as a basis signal separation control unit 113a, a frequency calculation unit 113b, an energy correction parameter calculation unit 113c, and a correction energy calculation unit 113d.

The basis signal separation control unit 113a separates the signal $h_i$ of the time-divided i-th frame which is an input signal into a plurality of basis signals g, and inputs the separated k-th basis signal $g_k$ to the frequency calculation unit 113b (step S11). For example, the signal may be separated in short-time Fourier analysis, wavelet analysis, an empirical mode decomposition (EMD) method, or the like.

The frequency calculation unit 113b calculates a frequency $f_k$ of the k-th basis signal $g_k$ in, for example, discrete Fourier analysis, Hilbert spectrum analysis, or the like, and inputs the frequency $f_k$ to the energy correction parameter calculation unit 113c (step S12).

The energy correction parameter calculation unit 113c calculates an exponent value $b_k$ and an amplitude threshold $T_k$ described with reference to FIGS. 21 and 22 based on the frequency $f_k$, and inputs the values to the correction energy calculation unit 113d (step S13).

Based on the exponent value $b_k$ and the amplitude threshold $T_k$, the correction energy calculation unit 113d calculates a correction energy $I_{pc}$ for each basis signal $g_k$ according to the expression shown in Math 3, and outputs a scalar value $e_i$ obtained by summing the correction energies of all the basis signals $g_k$ (step S14).

Next, as a second example of the vibration waveform generation process of the terminal 1 illustrated in FIG. 16, a low-frequency component separation process in the energy control process shown in FIG. 26 will be described with reference to the block diagram (steps S101 to S105) illustrated in FIG. 29.

Figure 29:
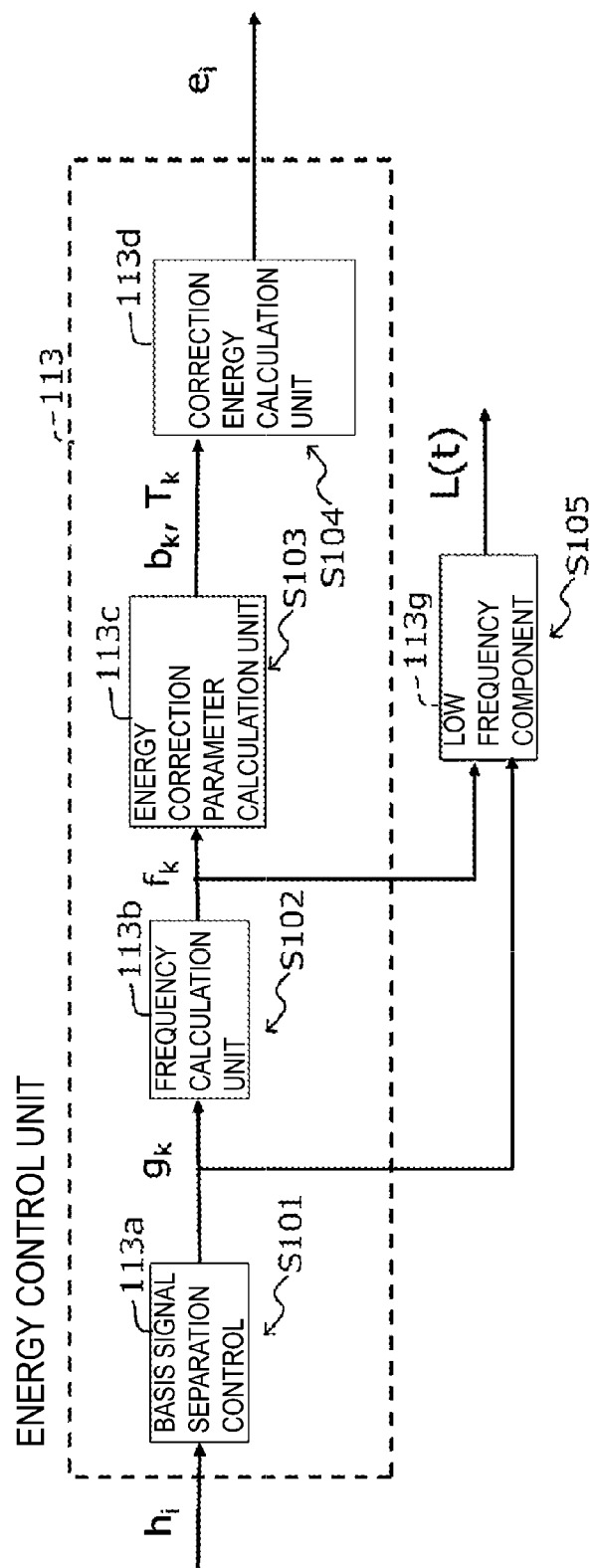
FIG. 29 is a block diagram for describing a low-frequency component separation process in the energy control process illustrated in FIG. 26 as a second example of the vibration waveform generation process of the terminal illustrated in FIG. 16.

As illustrated in FIG. 29, the energy control unit 113 may function as the basis signal separation control unit 113a, the frequency calculation unit 113b, the energy correction parameter calculation unit 113c, and the correction energy calculation unit 113d, and may also function of separating low-frequency components to a low frequency component combining unit 113g.

The basis signal separation control unit 113a separates the signal $h_i$ of the time-divided i-th frame which is an input signal into a plurality of basis signals g, and inputs the separated k-th basis signal $g_k$ to the frequency calculation unit 113b (step S101). For example, the signal may be separated in short-time Fourier analysis, wavelet analysis, an EMD method, or the like.

The frequency calculation unit 113b calculates a frequency $f_k$ of the k-th basis signal $g_k$ in, for example, discrete Fourier analysis, Hilbert spectrum analysis, or the like, and inputs the frequency $f_k$ to the energy correction parameter calculation unit 113c (step S102).

The energy correction parameter calculation unit 113c calculates an exponent value $b_k$ and an amplitude threshold $T_k$ described with reference to FIGS. 21 and 22 based on the frequency $f_k$, and inputs the values to the correction energy calculation unit 113d (step S103).

Based on the exponent value $b_k$ and the amplitude threshold $T_k$, the correction energy calculation unit 113d calculates a correction energy $I_{pc}$ for each basis signal $g_k$ according to the expression shown in Math 3, and outputs a scalar value $e_i$ obtained by summing the correction energies of all the basis signals $g_k$ (step S104).

The low frequency component combining unit 113g generates a low-frequency component L(t) by combining basis signals in which frequency $f_k$ of the basis signal g is lower than a predetermined frequency (step S105).

For a sound source including signals of a plurality of frequency bands, there is a case in which a vibration energy of a specific frequency band is desired to be emphasized and presented as vibration. Energy control units 1131 and 1132 as modifications applied when a waveform is converted by adjusting an energy of a basis signal present in a predetermined frequency band in the above-described case will be described with reference to FIGS. 30 to 35.

Figure 30:
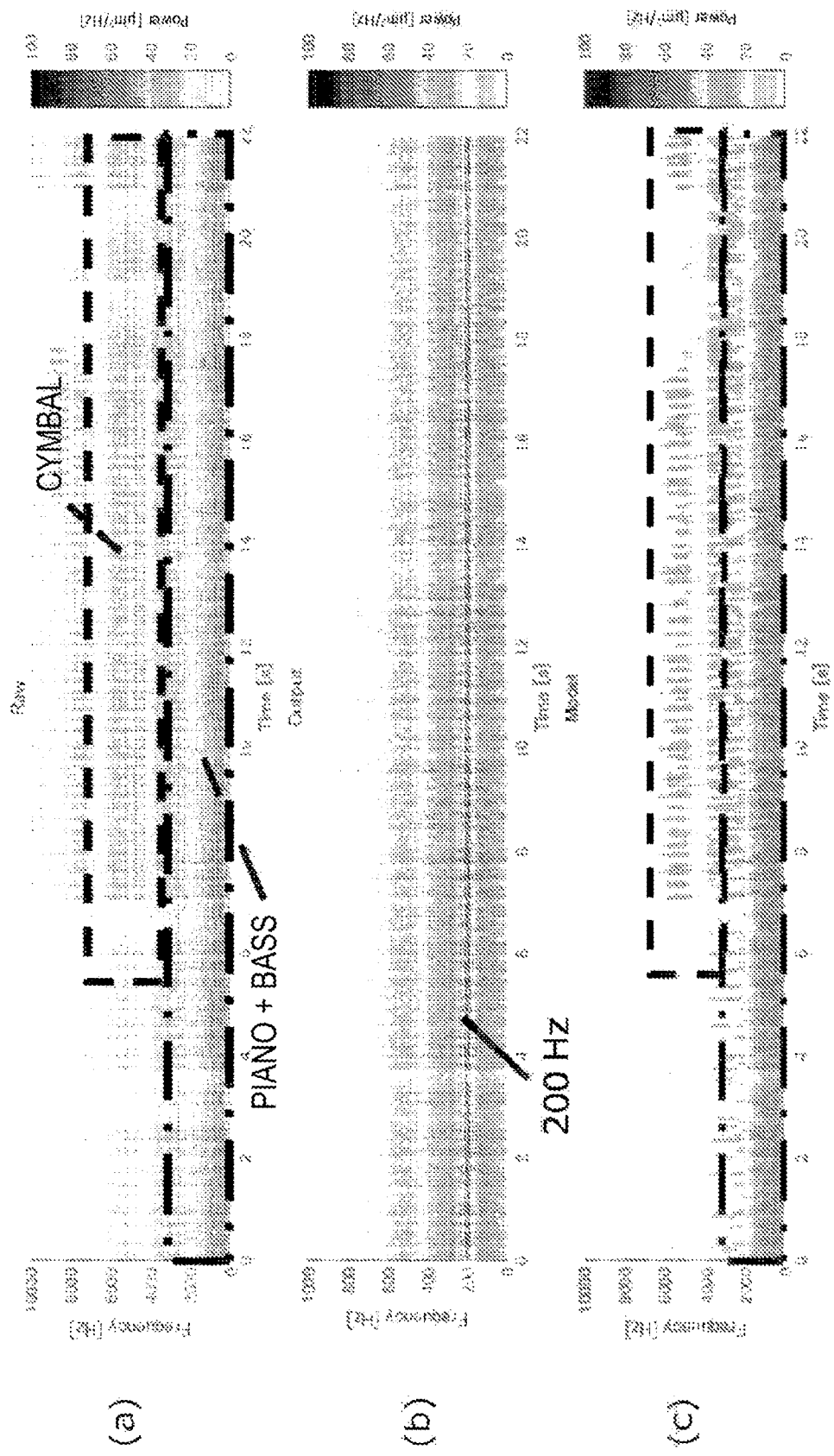
FIGS. 30(a) to 30(c) are graphs for explaining an example in which a vibration is generated according to ISM without emphasizing a waveform.

FIGS. 30(a) to 30(c) are graphs for explaining an example in which a vibration is generated according to ISM without emphasizing a waveform. FIG. 30 shows a band corresponding to a waveform of a cymbal (drum) of a high-frequency component from a musical piece of a piano trio and a band corresponding to waveforms of a piano and a bass. In FIG. 30(a) to FIG. 30(c), the horizontal axis represents time [s], the vertical axis represents frequency [Hz], the dark spectrum indicates high power, and the light spectrum indicates low power.

In FIG. 30(a), a waveform of the cymbal of high-frequency components indicated by the broken line and a waveform of a piano and a bass of low-frequency components indicated by the one-dot dashed line are shown as distributions of the sound source spectra.

In FIG. 30(b), a spectral distribution (200 Hz at the center) at the time of conversion by ISM is shown. In FIG. 30(b), all of the cymbal, the piano, and the bass are extracted as intensities due to the effect of the ISM.

In FIG. 30(c), an example in which the signals are not converted into signals having the frequency of 200 Hz based on the intensities, but are converted into signals by using the representative frequency of the basis signal is shown. Thus, the emphasized frequency band is visualized.

Figure 31:
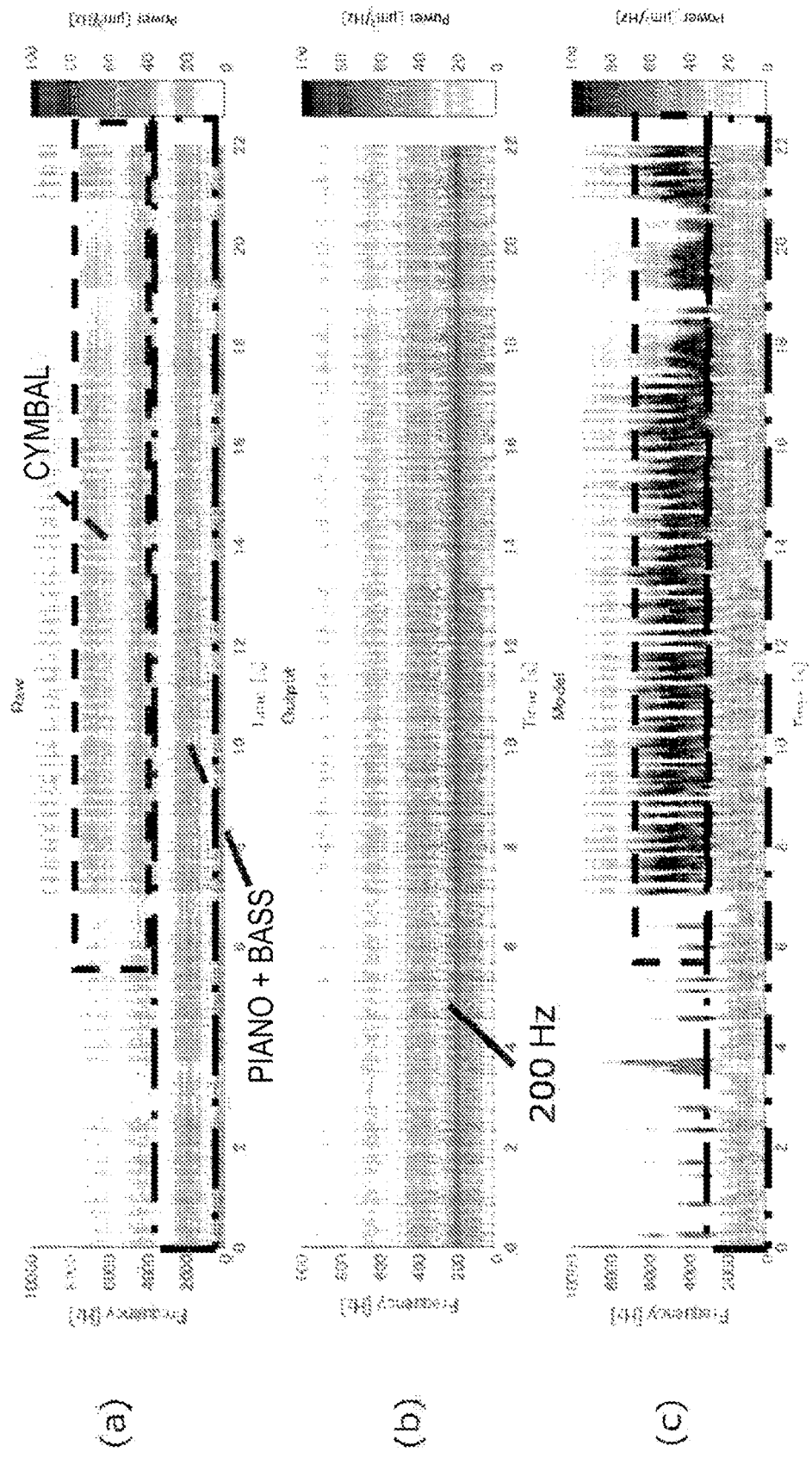
FIGS. 31(a) to 31(c) are graphs for explaining a first example in which high-frequency components equal to or higher than 3000 Hz are emphasized and separated from a sound source.

FIGS. 31(a) to 31(c) are graphs for explaining a first example in which high-frequency components are emphasized and separated from a sound source. In FIG. 31, an example in which a cymbal (drum) of high-frequency components is emphasized and separated from a musical piece of piano trio is illustrated. In FIG. 31(a) to FIG. 31(c), the horizontal axis represents time [s], the vertical axis represents frequency [Hz], the dark spectrum indicates high power, and the light spectrum indicates low power.

In FIG. 31(a), a waveform of the cymbal of high-frequency components indicated by the broken line and a waveform of a piano and a bass of low-frequency components indicated by the one-dot dashed line are shown as distributions of the sound source spectra.

In FIG. 31(b), a spectral distribution (200 Hz at the center) at the time of conversion by ISM is shown. In FIG. 31(b), +20 dB (100 times) is applied only to intensities equal to or higher than 3000 Hz.

In FIG. 31(c), an example in which the signals are not converted into signals having the frequency of 200 Hz based on the intensities, but are converted into signals by using the representative frequency of the basis signal is shown. Thus, the emphasized frequency band is visualized. In FIG. 31(c), the power of the spectrum of the cymbal increases.

Figure 32:
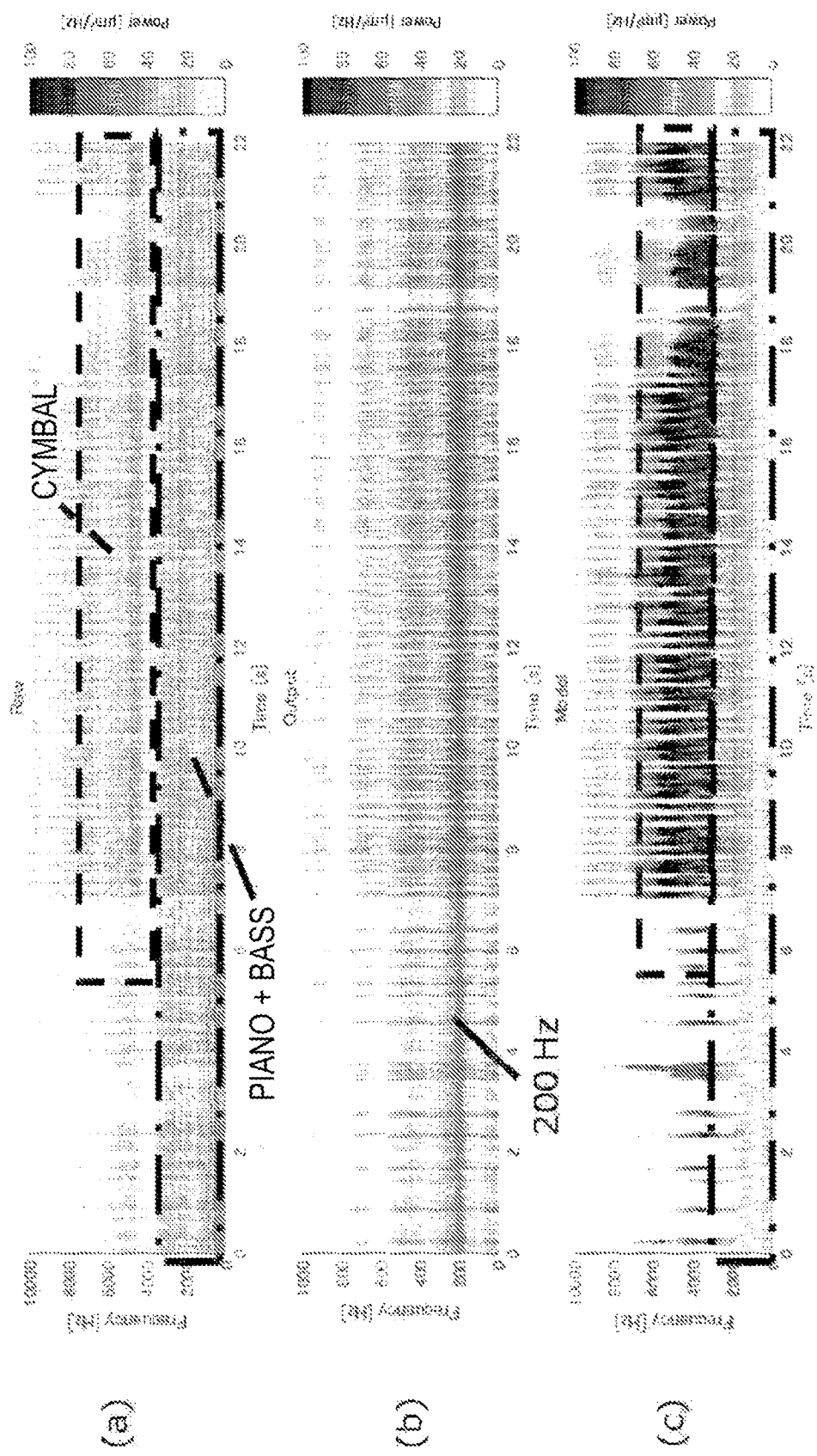
FIGS. 32(a) to 32(c) are graphs for explaining a second example in which high-frequency components equal to or higher than 3000 Hz are emphasized and separated from a sound source.

FIGS. 32(a) to 32(c) are graphs for explaining a second example in which high-frequency components are emphasized and separated from a sound source. In FIG. 32, an example in which a cymbal (drum) of high-frequency components is emphasized and separated from a musical piece of piano trio is illustrated. In FIGS. 32(a) to 32(c), the horizontal axis represents time [s], the vertical axis represents frequency [Hz], the dark spectrum indicates high power, and the light spectrum indicates low power.

In FIG. 32(a), a waveform of the cymbal of high-frequency components indicated by the broken line and a waveform of a piano and a bass of low-frequency components indicated by the one-dot dashed line are shown as distributions of the sound source spectra.

In FIG. 32(b), a spectral distribution (200 Hz at the center) at the time of conversion by ISM is shown. In FIG. 32(b), while +20 dB (100 times) is applied to the intensities equal to or higher than 3000 Hz, while −10 dB (1/10 times) is applied to the intensities equal to or lower than 1000 Hz.

In FIG. 32(c), an example in which the signals are not converted into signals having the frequency of 200 Hz based on the intensities, but are converted into signals by using the representative frequency of the basis signal is shown. Thus, the emphasized frequency band is visualized. In FIG. 32(c), the power of the spectrum of the cymbal increases.

Figure 33:
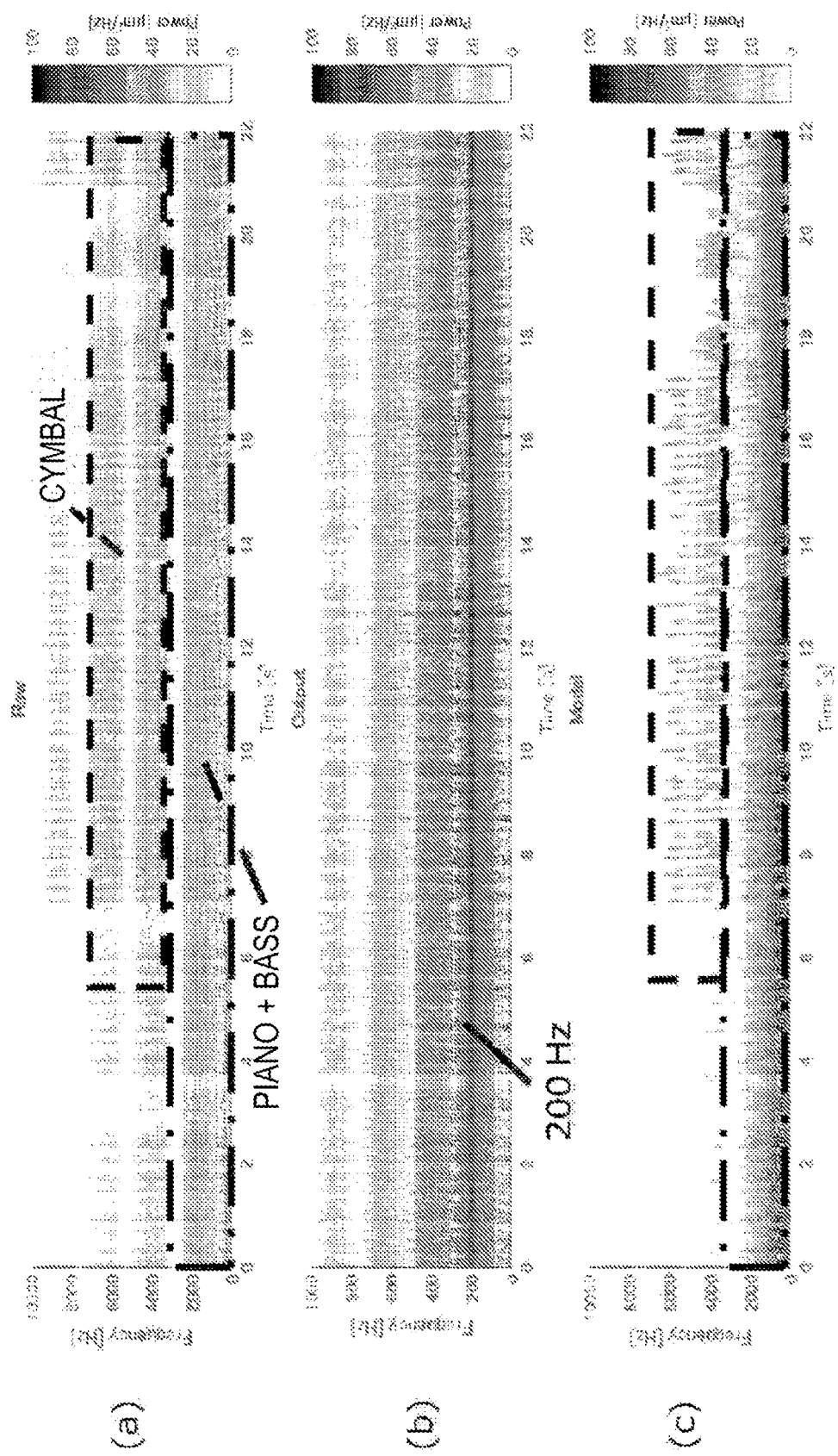
FIGS. 33(a) to 33(c) are graphs for explaining an example in which low-frequency components lower than or equal to 1000 Hz are emphasized and separated from a sound source.

FIGS. 33(a) to 33(c) are graphs for explaining an example in which low-frequency components are emphasized and separated from a sound source. In FIG. 33, an example in which the piano and the bass of low-frequency components are emphasized and separated from a musical piece of piano trio is illustrated. In FIGS. 33(a) to 33(c), the horizontal axis represents time [s], the vertical axis represents frequency [Hz], the dark spectrum indicates high power, and the light spectrum indicates low power.

In FIG. 33(a), a waveform of the cymbal of high-frequency components indicated by the broken line and a waveform of a piano and a bass of low-frequency components indicated by the one-dot dashed line are shown as distributions of the sound source spectra.

In FIG. 33(b), a spectral distribution (200 Hz at the center) at the time of conversion by ISM is shown. In FIG. 33(b), +10 dB (10 times) is applied only to intensities equal to or lower than 1000 Hz.

In FIG. 33(c), an example in which the signals are not converted into signals having the frequency of 200 Hz based on the intensities, but are converted into signals by using the representative frequency of the basis signal is shown. Thus, the emphasized frequency band is visualized. In FIG. 33(c), the power of the spectrum of the piano and the bass is increased.

The process of emphasizing and separating any frequency component shown in FIGS. 30 to 33 is also applicable to the bidirectional tactile transmission system 100 illustrated in FIG. 1. That is, while, among frequency components of signals, the energy of a signal in a specific frequency band may be adjusted and the waveform of the signal may be converted, the energy of a signal outside the specific frequency band may be maintained and the signal may be converted to have a waveform having a different frequency. In addition, while a signal extracted based on a specific signal feature amount may be converted to have a waveform by adjusting the energy, a signal not extracted in the specific feature amount may be converted to have a waveform having a different frequency while maintaining the energy.

A first modification of the energy control process illustrated in FIG. 26 will be described based on the block diagram (steps S41 to S45) illustrated in FIG. 34.

Figure 34:
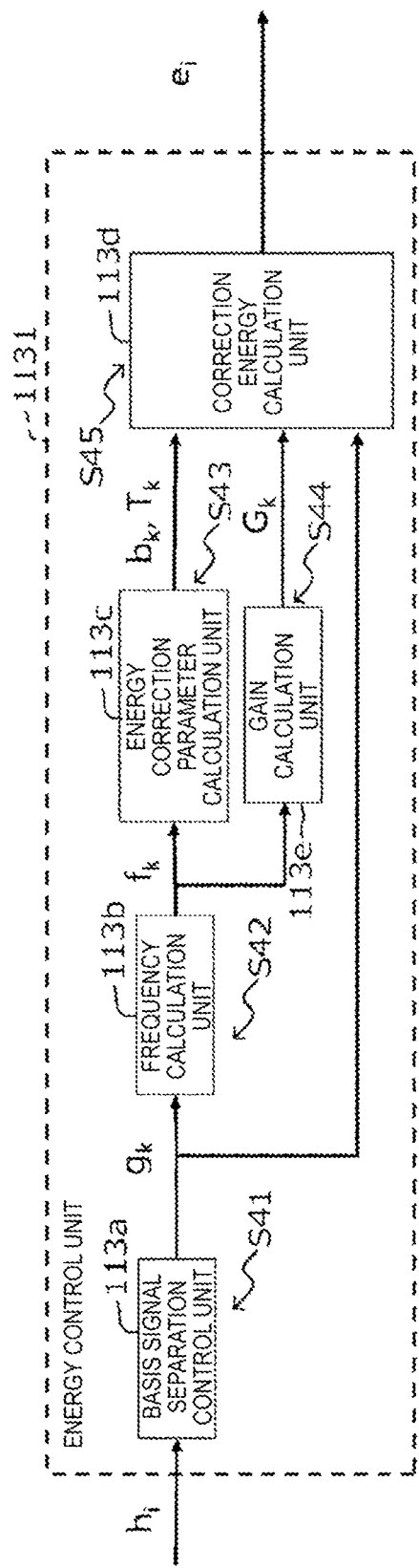
FIG. 34 is a block diagram for describing a first modification of the energy control process illustrated in FIG. 26.

As illustrated in FIG. 34, the energy control unit 1131 functions as a gain calculation unit 113e in addition to the basis signal separation control unit 113a, the frequency calculation unit 113b, the energy correction parameter calculation unit 113c, and the correction energy calculation unit 113d illustrated in FIG. 28.

The basis signal separation control unit 113a separates the signal $h_i$ of the time-divided i-th frame which is an input signal into a plurality of basis signals g, and inputs the separated k-th basis signal $g_k$ to the frequency calculation unit 113b (step S41). For example, the signal may be separated in short-time Fourier analysis, wavelet analysis, an EMD method, or the like.

The frequency calculation unit 113b calculates a frequency $f_k$ of the k-th basis signal $g_k$ in, for example, discrete Fourier analysis, Hilbert spectrum analysis, or the like, and inputs the frequency $f_k$ to the energy correction parameter calculation unit 113c (step S42).

The energy correction parameter calculation unit 113c calculates an exponent value $b_k$ and an amplitude threshold $T_k$ described with reference to FIGS. 21 and 22 based on the frequency $f_k$, and inputs the values to the correction energy calculation unit 113*d* (step S43).

The gain calculation unit 113*e* outputs a gain value $G_k$ at a predetermined frequency band in accordance with the calculated frequency $f_k$ of the basis signal $g_k$ (step S44). When the energy is to be emphasized, $G_k>1$ is set, and when the energy is to be suppressed, $0 \leq G_k < 1$ is set. The energy may be adjusted through emphasis or suppression in one frequency band or in a plurality of frequency bands. In addition, the energy may be adjusted in the entire frequency band input to the energy control unit 1131.

The correction energy calculation unit 113*d* calculates a gain-adjusted correction energy $I_{pc}$ for each basis signal $g_k$ in accordance with the following formula represented by Math 4 below with respect to the amplitude A of the separated basis signal $g_k$, and outputs a scalar value $e_i$ obtained by summing the correction energies of all the basis signals $g_k$ (step S45).

$$I_{pc} = G\left(\frac{A^2}{T_f^2}\right)^{b_f} \quad \text{[Math 4]}$$

A second modification of the energy control process shown in FIG. 26 will be described based on the block diagram (steps S51 to S56) illustrated in FIG. 35.

Figure 35:
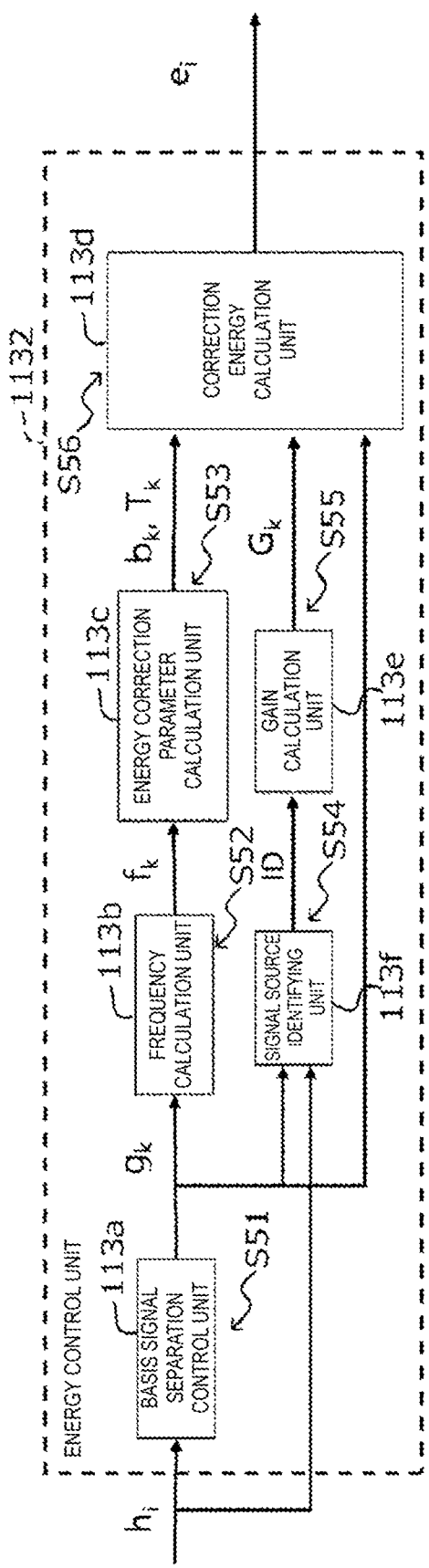
FIG. 35 is a block diagram for describing a second modification of the energy control process illustrated in FIG. 26.

As illustrated in FIG. 35, the energy control unit 1132 functions as a gain calculation unit 113*e* and a signal source identifying unit 113*f* in addition to the basis signal separation control unit 113*a*, the frequency calculation unit 113*b*, the energy correction parameter calculation unit 113*c*, and the correction energy calculation unit 113*d* illustrated in FIG. 28.

The basis signal separation control unit 113*a* separates the signal $h_i$ of the time-divided i-th frame which is an input signal into a plurality of basis signals g, and inputs the separated k-th basis signal $g_k$ to the frequency calculation unit 113*b* (step S51). For example, the signal may be separated in short-time Fourier analysis, wavelet analysis, an EMD method, or the like.

The frequency calculation unit 113*b* calculates a frequency $f_k$ of the k-th basis signal $g_k$ in, for example, discrete Fourier analysis, Hilbert spectrum analysis, or the like, and inputs the frequency $f_k$ to the energy correction parameter calculation unit 113*c* (step S52).

The energy correction parameter calculation unit 113*c* calculates an exponent value $b_k$ and an amplitude threshold $T_k$ described with reference to FIGS. 21 and 22 based on the frequency $f_k$, and inputs the values to the correction energy calculation unit 113*d* (step S53).

The signal source identifying unit 113*f* estimates identification candidates from the histories of the input signals $h_i$ and $h_i$ based on the set signal features, identifies which signal source the basis signal $g_k$ belongs to, and outputs the identification result as an ID (identifier) or the like (step S54). The signal source identifying unit 113*f* may prepare an identifier in advance through machine learning or the like. For example, features of many musical instruments may be learned in deep learning, a candidate group (e.g., piano, bass, drum) may be estimated to ascertain which musical instrument is included in the current input signal $h_i$ (or the history of each of a plurality of input signals $h_i$ if the input signal $h_i$ is too short), and which musical instrument includes the basis signal $g_k$ may be identified.

The gain calculation unit 113*e* outputs the gain value $G_k$ at the predetermined frequency band in accordance with the ID specified by the signal source identifying unit 113*f* (step S55). When the energy is to be emphasized, $G_k>1$ is set, and when the energy is to be suppressed, $0 \leq G_k < 1$ is set. The energy may be adjusted through emphasis or suppression in one frequency band or in a plurality of frequency bands. In addition, the energy may be adjusted in the entire frequency band input to the energy control unit 1132.

The correction energy calculation unit 113*d* calculates a gain-adjusted correction energy $I_{pc}$ for each basis signal $g_k$ in accordance with the expression shown in Math 4 with respect to the amplitude A of the separated basis signal $g_k$, and outputs a scalar value $e_i$ obtained by summing the correction energies of all the basis signals $g_k$ (step S56).

Next, the details of the energy combining process shown in step S4 of FIG. 27 will be described with reference to the block diagram (steps S21 to S23) illustrated in FIG. 36.

The energy-vibration conversion unit 114*a* functions as an energy-equivalent conversion unit 1141*a*, a windowing processing unit 1142*a*, and a frame combining unit 1143*a*.

Figure 36:
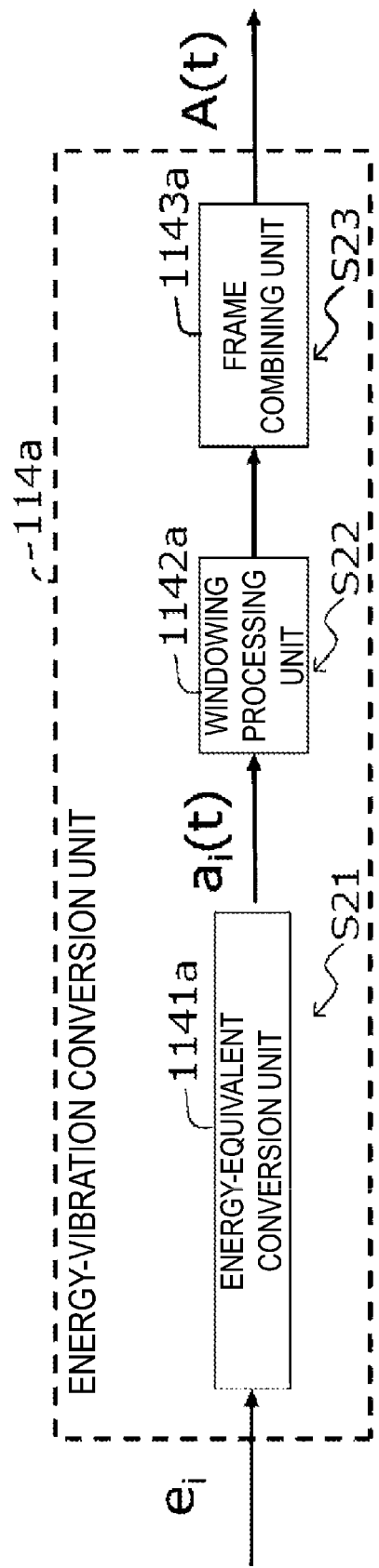
FIG. 36 is a block diagram for describing details of the energy synthesis process illustrated in FIG. 26.

As illustrated in FIG. 36, the energy-equivalent conversion unit 1141*a* converts the scalar value $e_i$ of the vibration energy calculated for each frame i into a vibration waveform having the same vibration energy but a different carrier frequency, and outputs an amplitude $a_i(t)$ of the waveform to the windowing processing unit 1142*a* (step S21).

The windowing processing unit 1142*a* performs windowing processing on the input amplitude $a_i(t)$ of each frame i by using the window function shown in FIG. 23, and inputs the processing result to the frame combining unit 1143*a* (step S22).

The frame combining unit 1143*a* combines frames on the input from the windowing processing unit 1142*a* for the first to N-th frames, and outputs the amplitude A(t) of the vibration waveform (step S23).

Next, details of the vibration waveform generation process shown in step S5 of FIG. 27 will be described based on the block diagram (steps S31 and S32) illustrated in FIG. 37.

Figure 37:
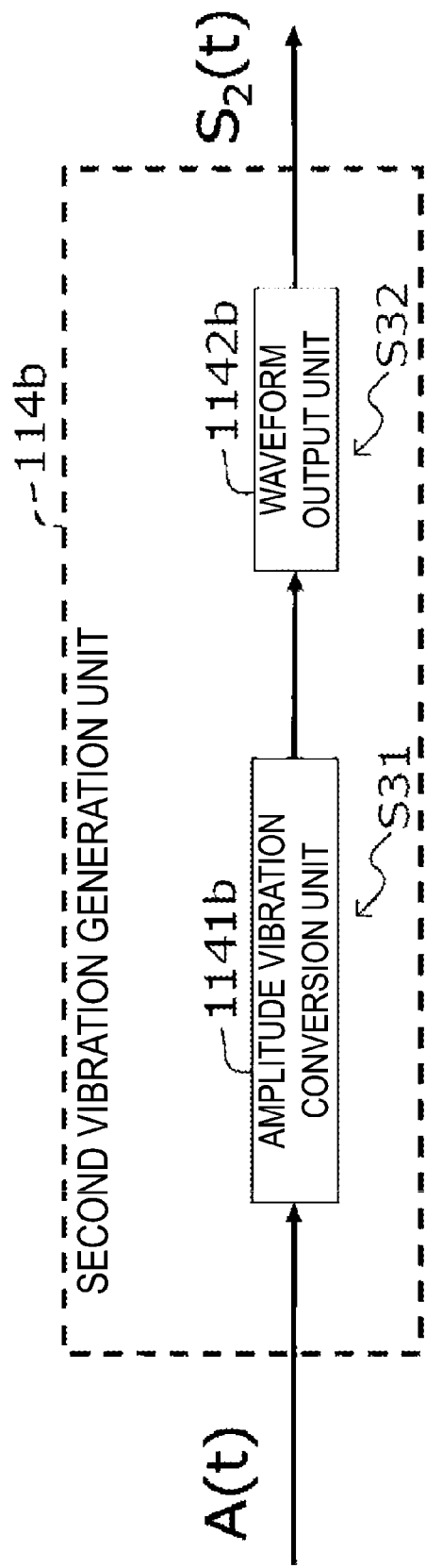
FIG. 37 is a block diagram for describing details of the corrected vibration waveform generation process illustrated in FIG. 26.

As illustrated in FIG. 37, the second vibration generation unit 114*b* functions as an amplitude vibration conversion unit 1141*b* and a waveform output unit 1142*b*. The second vibration generation unit 114*b* has an input signal A(t) and outputs a sine wave with a carrier frequency. The phase of the generated waveform may be controlled such that vibrations are smoothly connected.

The amplitude vibration conversion unit 1141*b* converts the input amplitude A(t) into a vibration (step S31).

The waveform output unit 1142*b* outputs the sine wave $S_2(t)$ with the carrier frequency so that the amplitude becomes A(t) (step S32).

[B] Effects

According to the bidirectional tactile transmission system 100, the tactile transmission program, and the tactile transmission method according to an example of the embodiment, for example, the following operational effects can be achieved.

The vibration sensor 31 measures vibrations generated in the vibration input/output device 3. The calculation unit 113A calculates perception information specified from a vibration measured by the vibration sensor 31. The conversion unit 114A converts a signal related to the vibration into a predetermined frequency while maintaining the perception information calculated by the calculation unit 113A. The signal output unit 115A outputs the converted signal converted by the conversion unit 114A to the vibrator 32 of another vibration input/output device 3 as an output vibration.

Accordingly, howling and loopback of a contact signal in the bidirectional tactile transmission system 100 can be reduced. Specifically, by modulating a signal of an actuator to a signal having a frequency different from the natural vibration of the housing and driving the actuator while maintaining the perception information, howling caused by bidirectional communication can be reduced. In addition, by keeping the drive signal of the actuator constant at a carrier frequency different from the natural vibration of the housing and removing a signal having this carrier frequency from the sensor signal, interference with the sensor signal can be prevented and loopback can be reduced.

[C] Others

The disclosed technology is not limited to each of the embodiments, and can be carried out with various modifications without departing from the scope of each embodiment. Each configuration and process of each embodiment can be selected as necessary, or may be appropriately combined.

Figure 38:
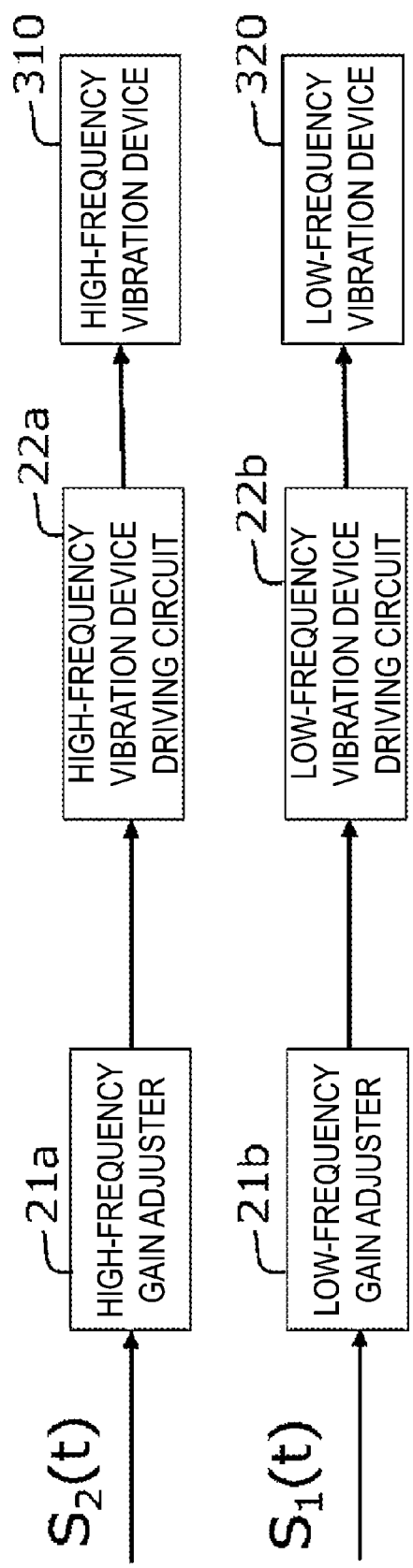
FIG. 38 is a block diagram illustrating a configuration example of a DAC when a plurality of vibration devices are used in the bidirectional tactile transmission system illustrated in FIG. 1.

FIG. 38 is a block diagram illustrating a configuration example of a DAC when a plurality of vibration devices 310 and 320 are used in the bidirectional tactile transmission system 100 illustrated in FIG. 1.

Figure 5:
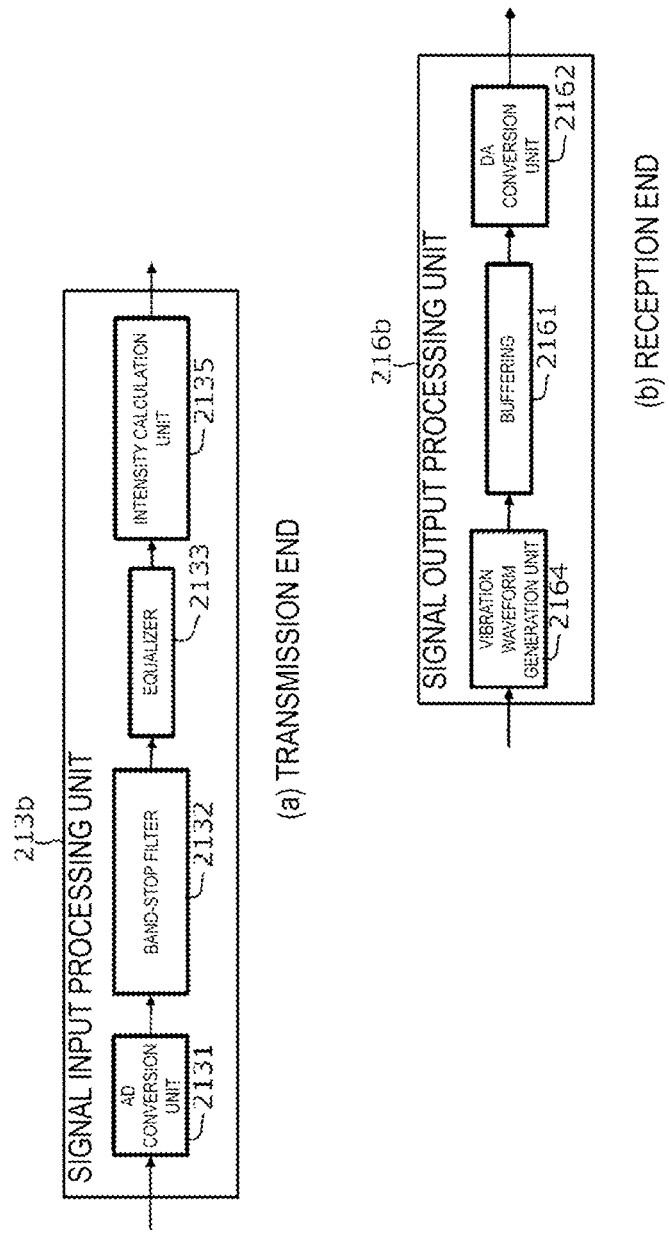
FIG. 5(a) is a block diagram illustrating a third example of the signal input processing unit illustrated in FIG. 2.
FIG. 5(b) is a block diagram illustrating a third example of the signal output processing unit illustrated in FIG. 2.

In the example illustrated in FIG. 38, the DA conversion unit 2162 illustrated in FIGS. 3 to 5 functions as a high-frequency gain adjuster 21a, a low-frequency gain adjuster 21b, a high-frequency vibration device driving circuit 22a, and a low-frequency vibration device driving circuit 22b. In addition, the vibrators 32 illustrated in FIG. 1 function as the high-frequency vibration device 310 and the low-frequency vibration device 320.

The high-frequency gain adjuster 21a outputs the second vibration waveform $S_2(t)$ input from the terminal 1 to the high-frequency vibration device 310 via the high-frequency vibration device driving circuit 22a. In addition, the low-frequency gain adjuster 21b outputs the first vibration waveform $S_1(t)$ input from the terminal 1 to the low-frequency vibration device 320 via the low-frequency vibration device driving circuit 22b.

Figure 39:
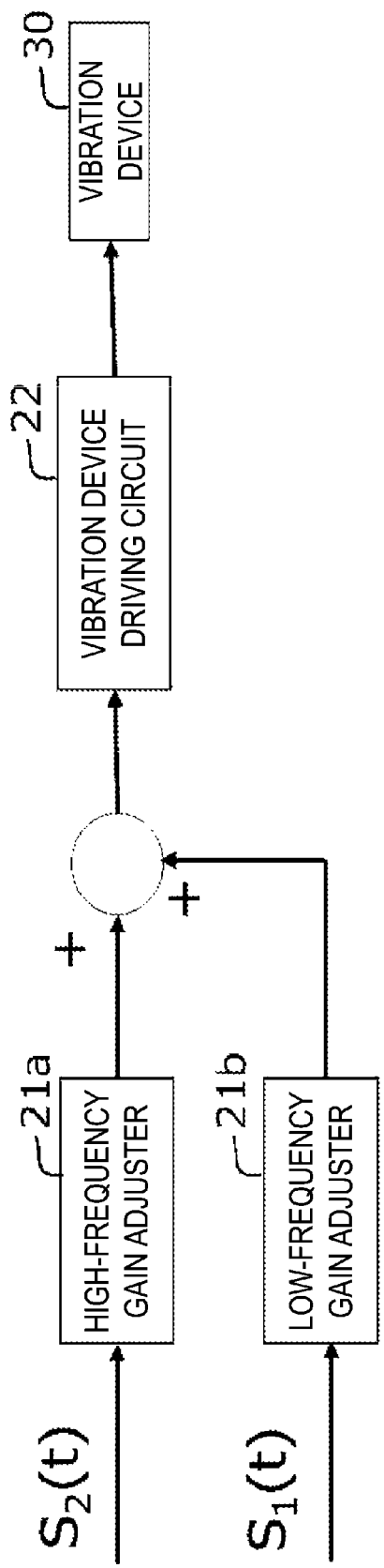
FIG. 39 is a block diagram illustrating a configuration example of a DAC when a single vibration device is used in the bidirectional tactile transmission system illustrated in FIG. 1.

FIG. 39 is a block diagram illustrating a configuration example of a DAC when a single vibration device is used in the bidirectional tactile transmission system 100 illustrated in FIG. 1.

In the example illustrated in FIG. 39, the DA conversion unit 2162 illustrated in FIGS. 3 to 5 functions as the high-frequency gain adjuster 21a, the low-frequency gain adjuster 21b, and a vibration device driving circuit 22. In addition, the vibrator 32 illustrated in FIG. 1 functions as a vibration device 30.

The high-frequency gain adjuster 21a and the low-frequency gain adjuster 21b output each of the second vibration waveform $S_2(t)$ and the first vibration waveform $S_1(t)$ input from the terminal 1 to the common vibration device 30 via the common vibration device driving circuit 22.

REFERENCE SIGNS LIST

100 Bidirectional tactile transmission system
1 Terminal
11 CPU
1000 ISM unit
111 Frequency removal control unit
111a Signal removal unit
111b Low-pass filter
111d Correction energy calculation unit
112 Time division control unit
113A Calculation unit
113, 1131, 1132 Energy control unit
113a Basis signal separation control unit
113b Frequency calculation unit
113c Energy correction parameter calculation unit
113d Correction energy calculation unit
113e Gain calculation unit
113f Signal source identifying unit
113g Low frequency component combining unit
114A Conversion unit
114a Energy-vibration conversion unit
114b Second vibration generation unit
114c First vibration generation unit
1141a Energy-equivalent conversion unit
1142a Windowing processing unit
1143a Frame combining unit
1141b Amplitude vibration conversion unit
1142b Waveform output unit
115A Signal output unit
12 Memory
13 Storage device
2 USB audio I/F
21a High-frequency gain adjuster
21b Low-frequency gain adjuster
211 Vibration measurement unit
212, 217 Signal amplifying unit
213 Signal input processing unit
2131 AD conversion unit
2132 Band-stop filter
2133 Equalizer
2134, 2163 Frequency conversion unit
2135 Intensity calculation unit
214 Signal transmission unit
215 Signal reception unit
216 Signal output unit
2161 Buffering
2162 DA conversion unit
2164 Vibration waveform generation unit
22 Vibration device driving circuit
22a High-frequency vibration device driving circuit
22b Low-frequency vibration device driving circuit
3, 3a to 3e Vibration input/output device
301 Contact plate
302 Fixing portion
31 Vibration sensor
310 High-frequency vibration device
32 Vibrator
320 Low-frequency vibration device
33 Contact position sensing sensor
4 Amplifier

The invention claimed is:

1. A bidirectional tactile transmission system including a tactile transmission device and a different tactile transmission device, the tactile transmission system comprising:
 a vibration sensor configured to measure a vibration generated at the tactile transmission device;
 a calculator configured to calculate perception information specified from the vibration measured by the vibration sensor;
 a convertor configured to convert a signal related to the vibration into a predetermined frequency while maintaining the perception information calculated by the calculator; and signal output processor circuitry configured to cause a vibrator of the different tactile transmission device to output a converted signal converted by the convertor as an output vibration, wherein, similarly, the different tactile transmission device causes a vibrator of the tactile transmission device to output a vibration generated at the different tactile transmission device as an output vibration.

2. The bidirectional tactile transmission system according to claim 1,
wherein the convertor converts the signal into a frequency other than a resonance frequency of a housing of the tactile transmission device as the predetermined frequency.

3. The bidirectional tactile transmission system according to claim 1,
wherein the calculator calculates an envelope curve specified from the vibration measured by the vibration sensor as the perception information,
wherein the convertor outputs the signal related to the vibration as an amplitude modulated signal converted in such a manner that the predetermined frequency becomes a carrier frequency while maintaining the envelope curve calculated by the calculator, and
wherein the signal output processor circuitry outputs the amplitude modulated signal converted by the convertor to the vibrator of the different tactile transmission device.

4. The bidirectional tactile transmission system according to claim 1,
wherein the calculator calculates a subjective intensity of a stimulus as the perception information from a waveform of the vibration measured by the vibration sensor, and
wherein the convertor converts the signal related to the vibration into the predetermined frequency by using a predetermined equivalent subjective intensity map in such a manner that the subjective intensity calculated by the calculator is maintained.

5. The bidirectional tactile transmission system according to claim 1,
wherein the calculator calculates a perceived intensity specified from the vibration measured by the vibration sensor as the perception information, and
wherein the convertor converts the signal related to the vibration into a waveform having a frequency different from a frequency of the signal while maintaining the perceived intensity calculated by the calculator.

6. The bidirectional tactile transmission system according to claim 5,
wherein the calculator divides the signal related to the vibration measured by the vibration sensor at predetermined time intervals and calculates the perceived intensity for each of the predetermined time intervals divided.

7. The bidirectional tactile transmission system according to claim 5,
wherein the convertor converts a signal in a specific frequency band among frequency components of the signal into the waveform by adjusting the perceived intensity and converts a signal outside the specific frequency band into a waveform having a frequency different from a frequency of the signal while maintaining the perceived intensity.

8. The bidirectional tactile transmission system according to claim 5,
wherein the convertor converts a signal extracted from the signal based on a specific signal feature amount into the waveform by adjusting the perceived intensity and converts a signal not extracted with the specific feature amount into a waveform having a frequency different from a frequency of the signal while maintaining the perceived intensity.

9. The bidirectional tactile transmission system according to claim 1,
wherein the convertor attenuates a specific frequency band by filtering in such a manner that loopback of a vibration output from the vibrator is reduced.

10. The bidirectional tactile transmission system according to claim 1, further comprising,
a contact position detection sensor configured to detect a contact position of a user with a housing of the tactile transmission device,
wherein the signal output processor circuitry causes the vibrator to output a sensation of movement of a vibration based on a result of detection by the contact position detection sensor.

11. The bidirectional tactile transmission system according to claim 1, comprising:
a plurality of the vibration sensors,
wherein the signal output processor circuitry causes the vibrator to output a sensation of movement of a vibration based on an input from each of the plurality of vibration sensors.

12. The bidirectional tactile transmission system according to claim 1,
wherein the signal output processor circuitry causes the different tactile transmission device to output sound, an image, or light simultaneously with an output of the converted signal from the vibrator.

13. The bidirectional tactile transmission system according to claim 1,
wherein the vibration sensor and the vibrator are disposed on a contact plate that is installed on an environment and transmits a vibration when a body of a user comes into contact with the contact plate.

14. The bidirectional tactile transmission system according to claim 1,
wherein the vibration sensor and the vibrator are disposed in a wearable device attachable to a body of a user.

15. The bidirectional tactile transmission system according to claim 1,
wherein the vibration sensor and the vibrator are disposed in a device held by a user.

16. A non-transitory computer-readable medium having one or more executable instructions stored thereon causing a computer in a bidirectional tactile transmission system including a tactile transmission device and a different tactile transmission device to perform:
measuring a vibration generated at the tactile transmission device;
calculating perception information specified from the vibration measured;
converting a signal related to the vibration into a predetermined frequency while maintaining the perception information calculated;
causing a vibrator of the different tactile transmission device to output a converted signal as an output vibration; and
causing, similarly by the different tactile transmission device, a vibrator of the tactile transmission device to output a vibration generated at the different tactile transmission device as an output vibration.

17. A bidirectional tactile transmission method for a bidirectional tactile transmission system including a tactile transmission device and a different tactile transmission device, a bidirectional tactile transmission method causing to perform:

measuring a vibration generated at the tactile transmission device;

calculating perception information specified from the vibration measured;

converting a signal related to the vibration into a predetermined frequency while maintaining the perception information calculated;

causing a vibrator of the different tactile transmission device to output a converted signal as an output vibration; and causing, similarly by the different tactile transmission device, a vibrator of the tactile transmission device to output a vibration generated at the different tactile transmission device as an output vibration.

* * * * *